(12) United States Patent
Hao

(10) Patent No.: US 6,437,709 B1
(45) Date of Patent: Aug. 20, 2002

(54) KEYBOARD AND THEREOF INPUT METHOD

(76) Inventor: Qi Hao, No. 85 South Songshan Road, Zhengzhou City, Henan Province 450052 (CN)

( * ) Notice: Subject to any disclaimer, the term of this patent is extended or adjusted under 35 U.S.C. 154(b) by 0 days.

(21) Appl. No.: 09/214,841
(22) PCT Filed: Sep. 9, 1998
(86) PCT No.: PCT/CN98/00185
§ 371 (c)(1),
(2), (4) Date: Jan. 13, 1999
(87) PCT Pub. No.: WO00/14622
PCT Pub. Date: Mar. 16, 2000
(51) Int. Cl.⁷ .............................................. H03M 11/00
(52) U.S. Cl. .............................. 341/23; 341/20; 341/22; 345/168; 345/811
(58) Field of Search ................................ 341/20, 22, 23; 379/368, 93, 18; 455/566; 345/168, 172, 811; 708/142; 710/67

(56) References Cited

U.S. PATENT DOCUMENTS

| | | | | |
|---|---|---|---|---|
| 4,918,721 A | * | 4/1990 | Hashimoto | 379/96 |
| 5,097,425 A | * | 3/1992 | Baker | 341/22 |
| 5,128,672 A | * | 7/1992 | Kaehler | 341/23 |
| 5,786,776 A | * | 7/1998 | Kisaichi et al. | 341/23 |
| 5,818,437 A | * | 10/1998 | Grover et al. | 345/811 |
| 5,953,541 A | * | 9/1999 | King | 345/168 |
| 6,005,495 A | * | 12/1999 | Connolly et al. | 341/22 |
| 6,011,554 A | * | 1/2000 | King | 345/168 |
| 6,043,760 A | * | 3/2000 | Laakkonen | 341/22 |
| 6,223,059 B1 | * | 4/2001 | Haestrup | 455/566 |
| 6,286,064 B1 | * | 9/2001 | King | 710/67 |

FOREIGN PATENT DOCUMENTS

| | | |
|---|---|---|
| CN | 1061293 | 5/1992 |
| CN | 1091841 | 9/1994 |
| CN | 1156856 | 8/1997 |

* cited by examiner

Primary Examiner—Michael Horabik
Assistant Examiner—Albert K. Wong
(74) Attorney, Agent, or Firm—Pennie & Edmonds LLP

(57) ABSTRACT

The present invention discloses a keyboard with less keys to input English words incessantly and an input method, wherein the key arrangement of the said keyboard may use the present or specially arranged computer keyboard, phone set keyboard, etc., to encode the English words with 2–13 keys, and build an English word encoding Database, according to the statistics of repeated code of a large number of English words, so we can Ceaselessly input the English words by means of said 2–13 keys in accordance with the correct spell rules or the affix simplifying rules of the English Words.

9 Claims, 17 Drawing Sheets

Writing board
Mouse board or display

| ⇧ ⇩ | Reset (Yes) | ← BkSp (Clr) | Power⊙ (No) |
|---|---|---|---|
| ot<br>1<br>,"  Home | ef<br>2<br>+=$ ↑ | id<br>3<br>.;: PgUp | Num Lock |
| am<br>4<br>((! ← | su<br>5<br>-_~ | qr<br>6<br>)}? → | Letter Lock |
| jn<br>7<br><[@  End | cy<br>8<br>*^£ ↓ | lx<br>9<br>>]# PgDn | Symbol Lock |
| pz<br>*<br>⇄ Ins | gh<br>0<br>/%\ Del | bk<br>#↵<br>&\| - Esc | Caps Lock |
| vw<br>⌨ | Ctrl | Alt | Fn |

Fig.15

KEYBOARD AND THEREOF INPUT METHOD

FIELD OF THE ART

The invention relates to a keyboard and a word input method for the said keyboard. More particularly, the present invention relates to the design of a common keyboard which can be used in such electronic products as telephones, computers, telegraphic TVs, and electronic dictionaries, and a simplified word input method used on the said keyboard.

BACKGROUND OF THE INVENTION

The present computer keyboard uses the keyboard arrangement of the prior mechanical typewriter, the inventor of the typewriter at that time arranged the letters adjacent on the positions relatively far away from each other, in order to decrease the mechanical block problems of the adjacent keys when typing, for example, the letters A and L in the common suffix -al are respectively arranged on the left and right ends of the keyboard; some frequently used letters are arranged on the key positions which are typed by the inflexible fingers, for example, the frequently used letter A is arranged on the key position typed by the little finger of the left hand (as shown in FIG. 1). All of this will set obstructs on the word input of the present computer keyboard.

Also, viewed from the tendency of the present personal computer changing from the desktop-type to the kneetop-type, palmtop-type, and the pocket-size type, and the development of the text transmission of the mobile telephone, the text input of the telegraphic TV, the present computer keyboard, which has 26 English letters, due to the large number keys and the large size, will obstruct the miniaturization and specialization and multiple applications. The present mobile telephone, such as Motorola GL-87C, Alcatel HC800 and the new type Nokia 5100, in which keyboards have already had the function of English letter input, and the input method is to arrange 26 letters on the number keys from 2 to 9. The arrangement is shown in the following table:

| Key name | English letter with same key | The maximum typing times |
| --- | --- | --- |
| 2 | A, B, C | 3 |
| 3 | D, E, F | 3 |
| 4 | G, H, I | 3 |
| 5 | J, K, L | 3 |
| 6 | M, N, O | 3 |
| 7 | P, Q, R, S | 4 |
| 8 | T, U, V | 3 |
| 9 | W, X, Y, Z | 4 |

And the cursor moving symbol ▶ is arranged on the position of the key # (as shown in FIG. 2).

Another keyboard arrangement, such mobile telephone as Nokia 2010, Nokia 232, in which keyboards are arranged as the following table:

| Key name | English letter with same key | The maximum typing times |
| --- | --- | --- |
| 2 | A, B, C | 3 |
| 3 | D, E, F | 3 |
| 4 | G, H, I | 3 |
| 5 | J, K, L | 3 |
| 6 | M, N | 2 |

-continued

| Key name | English letter with same key | The maximum typing times |
| --- | --- | --- |
| 7 | P, R, S | 3 |
| 8 | T, U, V | 3 |
| 9 | W, X, Y | 3 |
| 0 | O, Q, Z | 3 |

The letters O, Q, Z are arranged on key 0 (as shown in FIG. 3).

When inputting English on the above keyboard of the mobile telephone, the letters must be input in turn, when inputting each letter, the said key must be struck for n times according to the order of the desired letter on the key, the maximum typing number for each key is shown in the third row of the above table. After inputting a letter, the next letter must be input according to the cursor moving symbol (There is no cursor moving key on the keyboard of Nokia mobile telephone series, so one must wait for the cursor appearing automatically). This telephone keyboard and the English input method makes the English input too tedious, and one can not input the words incessantly.

THE OBJECT OF THE INVENTION

The object of the present invention is to change the arrangement of the present computer keyboard, simplify the present computer keyboard, and design a simple keyboard, which has less keys than the present computer keyboard. The newly designed computer keyboard has all functions, or the main functions of the present computer keyboard, and can realize incessant input, thus can be used in such electronic products as computers, telephones, the TVs, and the electronic dictionaries. At the meantime, the present invention also provides a simplified English input method which has higher speed of English input.

BRIEF SUMMARY OF THE INVENTION

The present invention uses less number (2 to 13) of symbol keys (numerials, symbols or letters) to replace the 26 English letters for encoding the English word, and builds a Database of English words, and selects the most preferred English word encoding, which have the lowest code repeated rate, by statistics of a large number of English words and comparison, and further designs a simple keyboard with less (2 to 13) keys, in which, the code repeated rate is defined as the following:

$$\text{Code repeated rate} = \frac{\text{The number of words with repeated codes in the library of the word encoding}}{\text{The number of all the words in the library of the word encoding}}$$

Besides, many English words are formed by combination of the basic word elements, thus the length of the English words can be shortened with common word roots in English being replaced by fixed and simplified word roots. According to the said simplified principles, English words can be further encoded, and simplified English input method designed.

In the present invention, the words in the library of English word encoding use the most common 20,415 words, which are concluded by the statistics of the word frequency for thousands of modem English articles and 45 popular English teaching materials by computer. analysis and comparison between the code repeated rate of the most common 20,415 words in the computer and the 200,000 common words, show that the 20,415 words have same code repeated rate as the 200,000 common words. So the said 20,415 words can represent the characteristics of the 200,000 common words. With the help of the longtime computation of multi the high speed computers, using the letter completely arranged method, comparing the English word repeated one by one , an English word encoding of 2 to 13-codes is selected, the said English word 2 to 13-code encoding has the lowest code repeated rate. According to the above most preferred English word encoding, and accompanied with the using frequency of each encoding and the statistics of the English common letter collocation and the word roots, the keyboard arrangement can be compared and optimized, so as to design the most preferred English letter keyboard arrangement, which is advantageous to input or remembrance, the said arrangement may use the present or specially arranged keyboard for the computer, telephone, and all the letters of English or other languages can be distributed onto 2 to 13 keys to achieve a simple keyboard, which uses less (2–13) keys to input English words incessantly.

Further, considering that people are accustomed to using the present keyboard and due to the requirement of some special users such as computer programmers, as a transition, the 26 English letters of the present computer keyboard can be rearranged, according to the above most preferred English letters keyboard arrangement, and according to the statistics of the using frequency of the letters, to provide a simple computer keyboard, in which letter arrangement suits for input by hand, and which has less (2 to 13) keys to achieve an incessant English word input.

The following table lists the times each letter appears and the appearing frequency in the 20,415 words in the order from large to small.

| Letters | number of appearance in 20,415 words | the appearance frequency |
|---|---|---|
| E | 18,170 | 11.78% |
| A | 12,493 | 8.10% |
| T | 12,468 | 8.08% |
| I | 11,984 | 7.77% |
| O | 11,588 | 7.51% |
| R | 11,079 | 7.18% |
| N | 10,876 | 7.05% |
| S | 8,711 | 5.65% |
| L | 8,042 | 5.21% |
| C | 6,388 | 4.14% |
| U | 5,617 | 3.64% |
| D | 5,057 | 3.28% |
| P | 4,477 | 2.90% |
| M | 4,246 | 2.75% |
| H | 4,125 | 2.67% |
| G | 3,506 | 2.27% |
| F | 3,115 | 2.02% |
| B | 3,039 | 1.97% |
| Y | 2,984 | 1.93% |
| V | 1,818 | 1.18% |
| W | 1,793 | 1.16% |
| K | 1,465 | 0.95% |
| X | 452 | 0.29% |
| Z | 285 | 0.18% |
| Q | 278 | 0.18% |
| J | 231 | 0.15% |

ADVANTAGES OF THE INVENTION

The simple computer keyboard of the present invention, changes the unreasonable letter arrangement of the present computer keyboard, arranges the letters having high using frequency under the more flexible fingers, and arranges the common letter collocation and the word roots according to the most preferred embodiment, which is suitable for the input by hand, and thus it can use the fingers reasonably during the input to avoid the muscle tiring, and can make inputs quicker and more fluent. Besides, the number of the keys is reduced to make the user remember the position of the key easily; by supplying corresponding software on the said keyboard to achieve blind input one hardly needs to move fingers; the above keyboard arrangement of English letters uses the encoding with the lowest code repeated rate to input words incessantly and more quickly; and further, because all of the words inputted come from the standard word library, or from the user's self-made word library or input letter one by one, it can ensure a correct spelling of the English words inputted, and there is no need to check the spelling after input. Also, it can shorten the length of the words inputted and further in crease the speed for inputting English words.

The common and simple keyboard of the present invention as the computer keyboard, can use less keys, reduce the size of the keyboard, and facilitate to miniaturize computers. By supplying corresponding software, it can achieve many functions such as English input, numeral input, punctuation input, special symbol input, function selection, operation control and other language input; the common and simple keyboard of the present invention is used as the telephone keyboard, besides having such functions as inputting text and sending text information on normal telephone or mobile telephone conveniently and quickly by supplying corresponding chips, it can also make the unification and standardization of various communication addresses by corresponding the digits of the telephone number to the English letter of communication address and electronic mail (E-mail) address or the combination of them, according to the English word encoding; used as a remote controller of the telegraphic TV, the said common and simple keyboard can input feedback information for TV marketing. the said common as simple keyboard can also be used as a remote controller for household electric apparatus; By using the common and simple keyboard, can eventually achieve the unification of such electronic products, as computer, telephone, TV, Fax, electronic dictionary, electronic game machine, electronic calculator, electronic clock, etc.

The following arrangements of the 2 to 13-code simple keyboard include several arrangements with higher code repeated rate (for example, the code repeated rate of the 2–4 code keyboard arrangements is higher than 10%), this is because that aligning with the appearance of the inputs of voice, manuscript and the brain wave, the text input function of the keyboard will become less important. The keyboard will be used together with microphone, manuscript board, and of the recognizer brain wave to input text. Thus it will be worthwhile to integrate English letters on to a few keys in the future.

BRIEF DESCRIPTION OF THE DRAWINGS

FIG. 15 is a sketch view of the common 13-code simple keyboard panel of the present invention.

DETAILED DESCRIPTION OF THE INVENTION

In each of the simple keyboards, mentioned below the English letter group and the numerals with identical numbers use the same key or compare with the context, thus the key position is named by the numeral of the said key position or of the corresponding position, except where it is other wise indicated.

Figure 16:
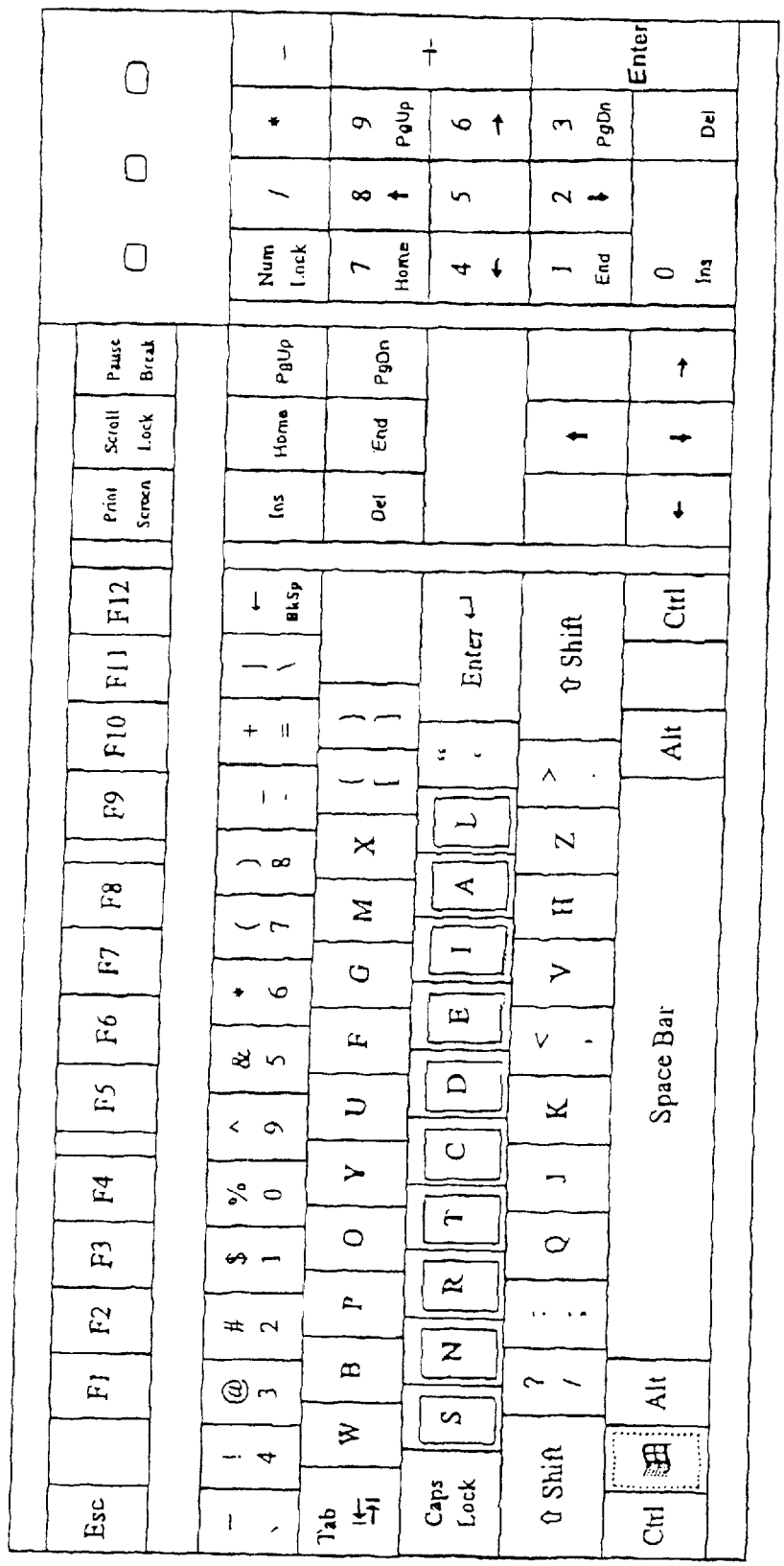
FIG. 16 is a sketch view of the common 10-code simple computer keyboard panel of the present invention (101/102 keys).
Figure 17:
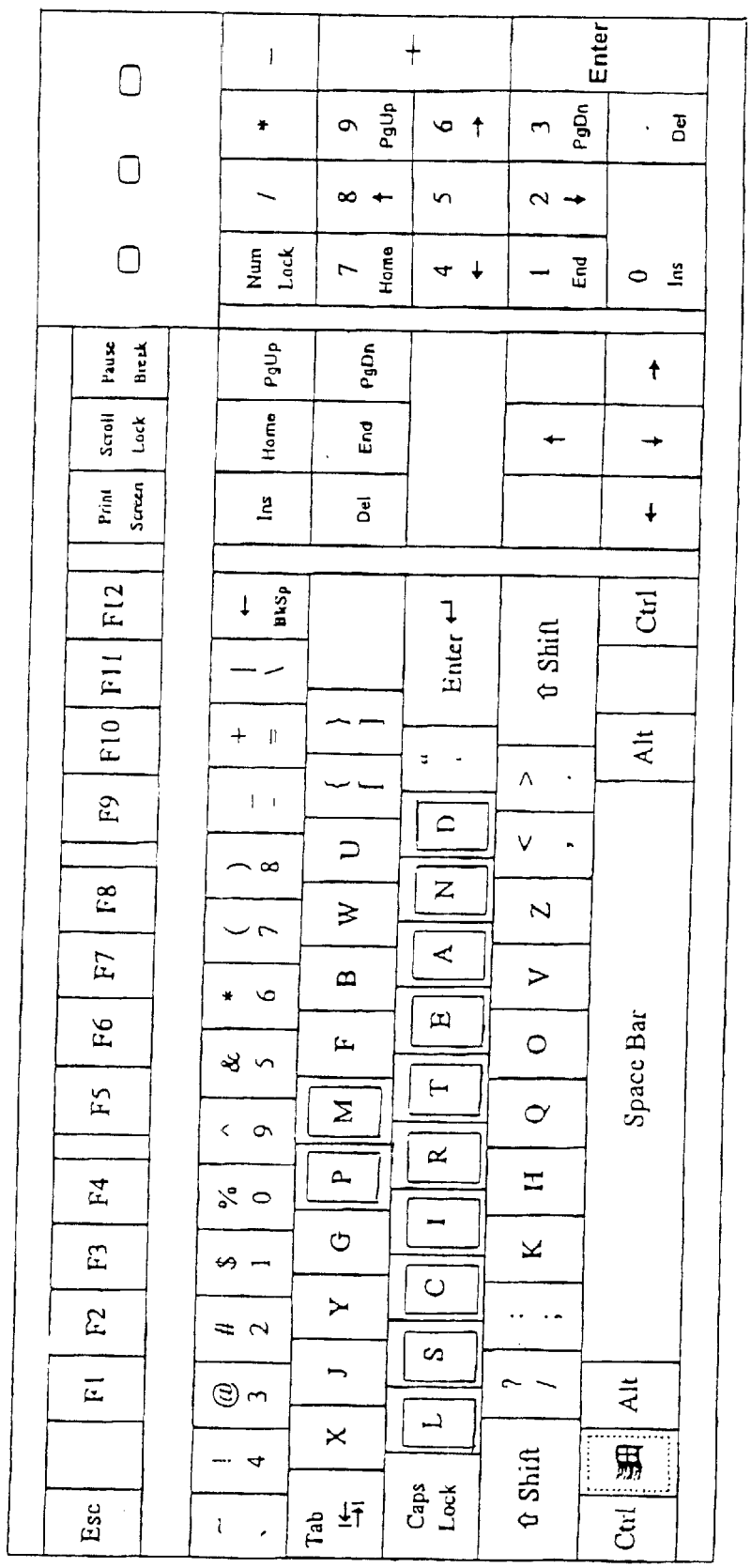
FIG. 17 is a sketch view of the common 12-code simple computer keyboard panel of the present invention (101/102 keys).

Further, in order to make the position of the numeral key remembered easily by users, the present invention also has difference in the numeral key arrangement of the computer keyboard in the simple keyboard which is suitable for the computer, numeral key 0, 1, 2, 3, 4 being arranged on the position of the right of the forefinger, the forefinger, the middle finger, the ring finger, and the little finger of the left hand respectively; the numeral key 9, 5, 6, 7, 8 being arranged on the position of the left of the forefinger, the forefinger, the middle finger, the ring finger, and the little finger of the right hand, which are shown in FIG. 16 and 17.

Figure 12:
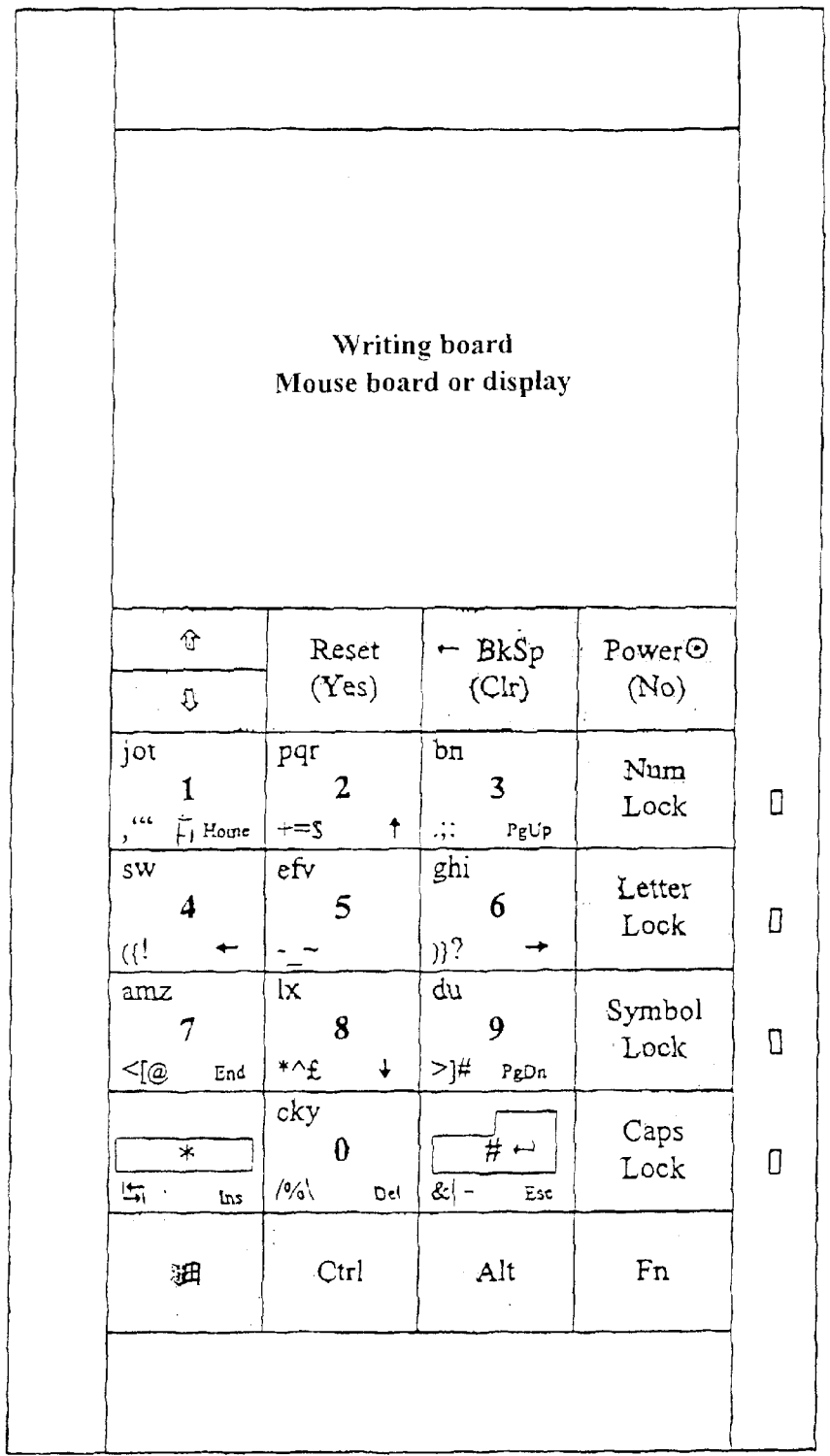
FIG. 12 is a sketch view of the common 10-code simple keyboard panel of the present invention.

One of the preferred embodiments of the present invention is the common 10-code simple keyboard. FIG. 12 is a sketch view of the common 10-code simple keyboard panel. The said keyboard panel includes the touch type writing board on the top, the mouse board and the display screen. In order to be used in telephone, computer, TV, all the functions of the present common computer keyboard are integrated in to the multi-functional keys, as shown in the following table.

| key name | Main letter and symbol | Else symbol | control key |
|---|---|---|---|
| 1 | J, O, T | ., ', " | Home |
| 2 | P, Q, R | +, =, $ | ↑ |

-continued

| key name | Main letter and symbol | Else symbol | control key |
|---|---|---|---|
| 3 | B, N | ., :, : | PgUp |
| 4 | S, W | (, {, ! | ← |
| 5 | E, F, V | -, —, ~ | → |
| 6 | G, H, I | ), }, ? | → |
| 7 | A, M, Z | <, [, @ | End |
| 8 | L, X | *, `, £ | ↓ |
| 9 | D, U | >, ], # | PgDn |
| 0 | C, K, Y | /, %, \ | Del |
| * | Space Bar | TAB, ' | Ins |
| # | Enter↵ | &, \|, ¬ | Esc |

In which the mathematical operation symbols +, −, *, / are arranged on the position of the keys 2, 5, 8, 0 in the middle row in turn, and the said simple keyboard also includes Windows icon, function keys Ctrl, Alt, Fn (which may be combined with the multi-function keys), reset key Reset (Yes), delete key Bksp (Clr), switch key Power (No), up and down roll key ⇧⇩, and option selected key: numeral state switch key NumLock, letter state switch key Letter Lock, symbol state switch key Symbol Lock, capitalized letter state switch key CapsLock, etc. (which can be switched to different input state according to requirement). The most preferred English word encoding and the most preferred English letter key arrangement are shown in the following table: (the repetition rate of the English words in the said embodiment is 1.73%)

| selected encoding symbol | English letter group with same code | position name of the key | using frequency of the code |
|---|---|---|---|
| t | J, O, T | 1 | 15.74% |
| r | P, Q, R | 2 | 10.26% |
| n | B, N | 3 | 9.02% |
| s | S, W | 4 | 6.81% |
| e | E, F, V | 5 | 14.97% |
| i | G, H, I | 6 | 12.71% |
| a | A, M, Z | 7 | 11.03% |
| l | L, X | 8 | 5.51% |
| u | D, U | 9 | 6.92% |
| c | C, K, Y | 0 | 7.02% |

The second row in the above table is the list of the English letter group having same code in the most preferred English word encoding, the said letter group list is the kernel of the most preferred English word encoding. Based on the most preferred English word encoding in the second row of the above table, and according to the code using frequency in English input, which is shown in the fourth row of the above table, the letter, which has high using frequency is arranged on the position of more flexible finger keys, for example: the three letters J, O, T, which have the highest using frequency during encoding (15.74%), are arranged on the position of the forefinger key; at the same meantime considering the common letter arrangement and the spelling of the word roots, for example: list the three keys I, A, L in turn with reference to the common suffixes -ial, -al; so as to synthesize and design the preferred arrangement of 10-code English letter keyboard, as shown in the second and third row in the above table.

The encoding symbols in the first row of the above table are the letters having the highest using frequency in the same line, however, the encoding symbols in the table can be displaced by numerals or symbols without affecting the contents of the most preferred English word encoding, (for example, the encoding symbol in the embodiment may use 10 numeral symbols from 0 to 9 on the key position, and thus be remembered and searched easily).

According to the above English letter arrangement, the common simple keyboard and the computers simple keyboard can be designed (the simple keyboards disclosed in the said embodiment are shown in FIGS. 12 and 16). The above keyboard also includes such symbols as punctuation, control symbol, to achieve various functions required by the said electronic products.

The following keyboard configurations of the 2 to 13-code (except 10-code) common simple keyboard embodiments are the same as the keyboard configuration of the 10-code common simple keyboard, except for the English word encoding. This can be illustrated by tables with reference to the above table illustration of the preferred 10-code English word encoding and the preferred English letter keyboard arrangement.

Figure 1:
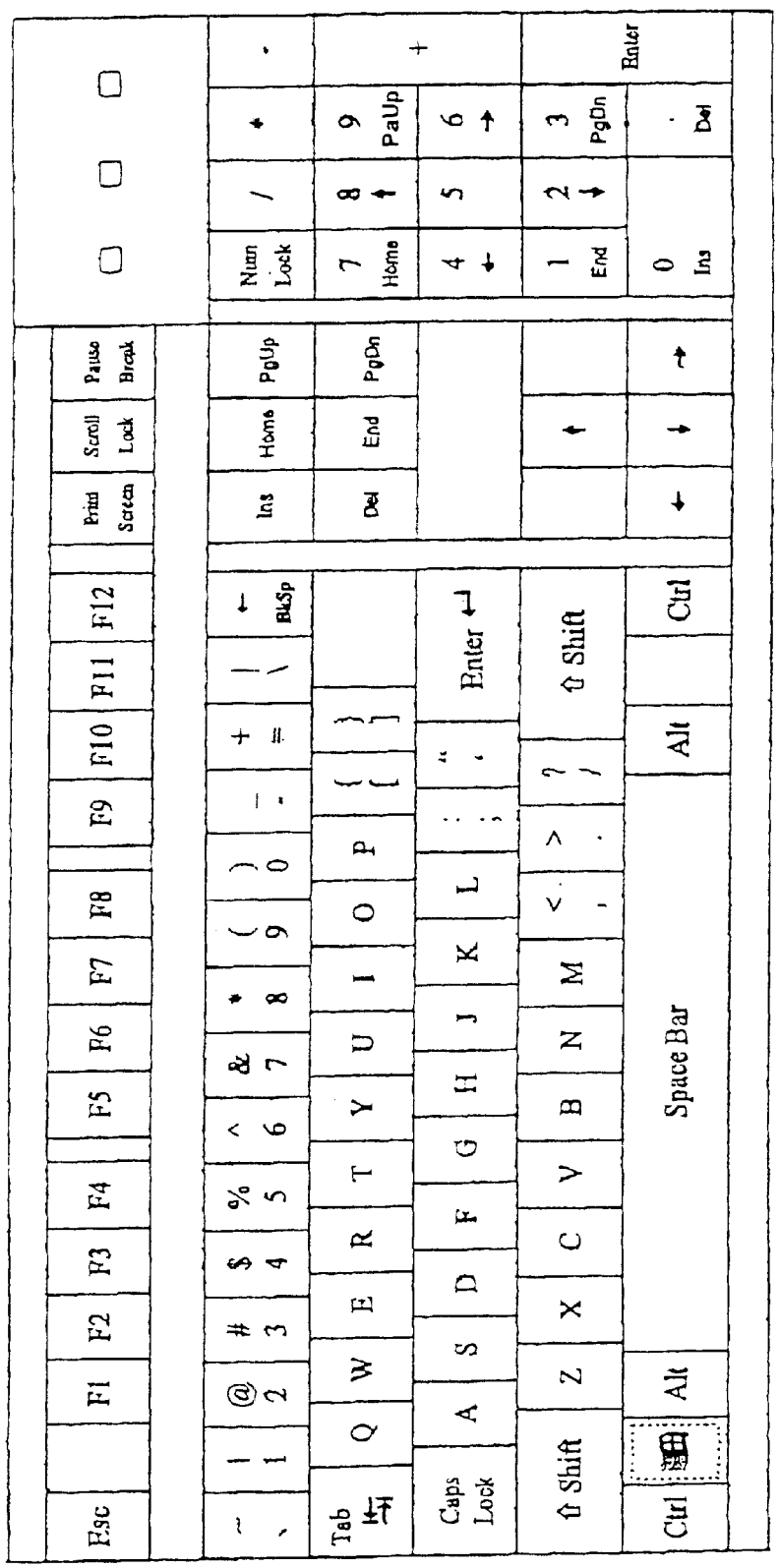
FIG. 1 is a sketch view of the present computer keyboard panel.
Figure 2:
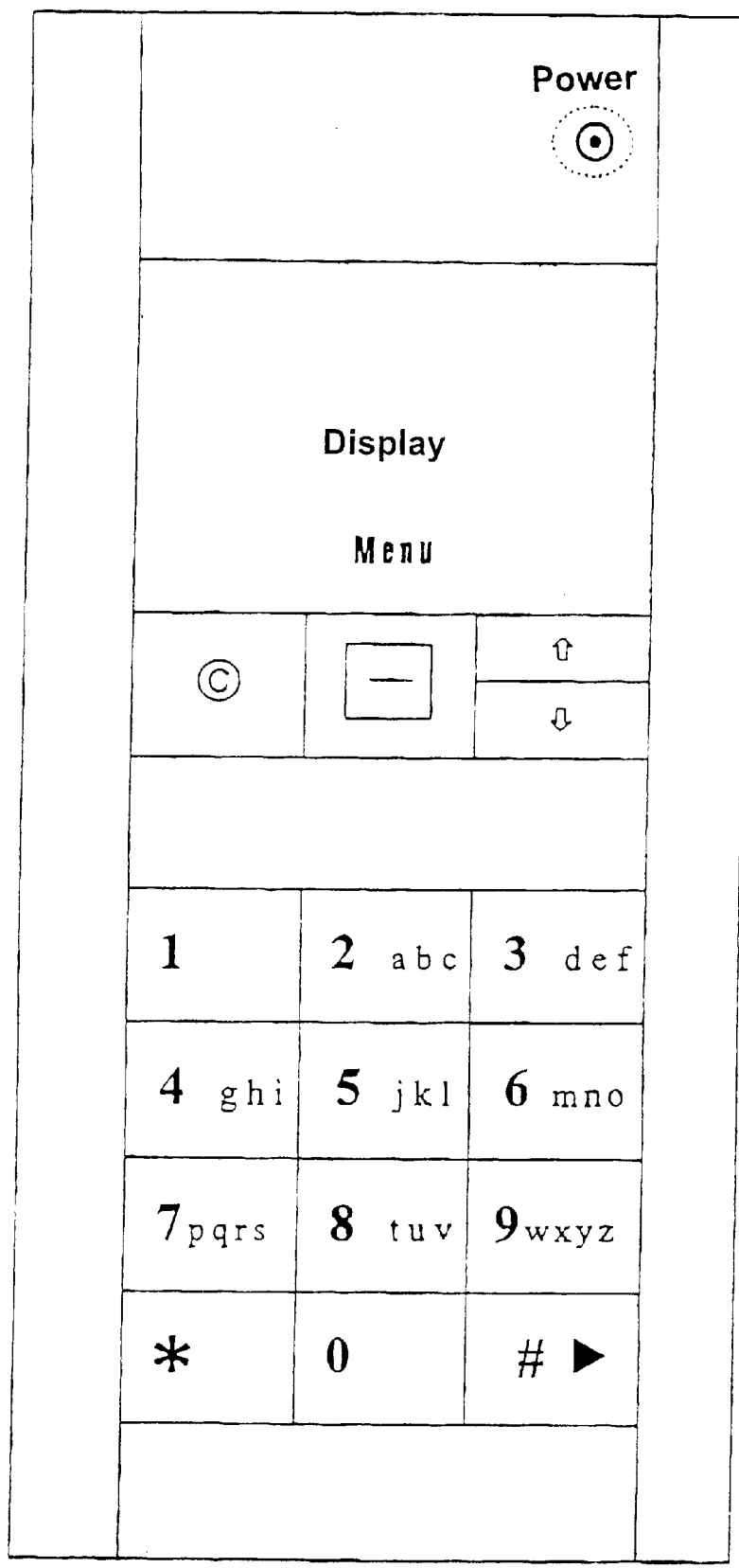
FIG. 2 is a sketch view of the keyboard panel of the present portable phone.
Figure 3:
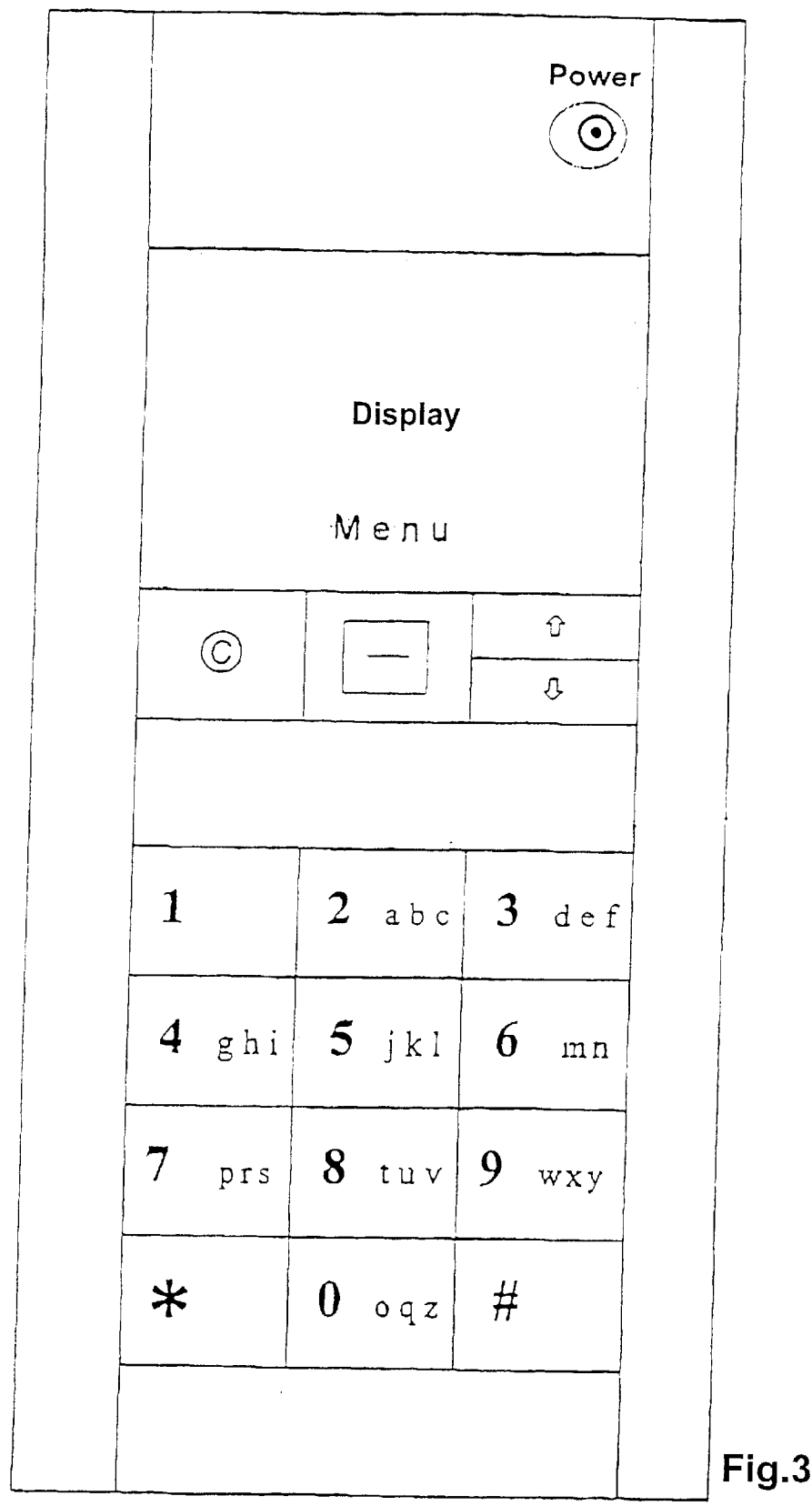
FIG. 3 is a sketch view of the keyboard panel of another present portable phone.
Figure 4:
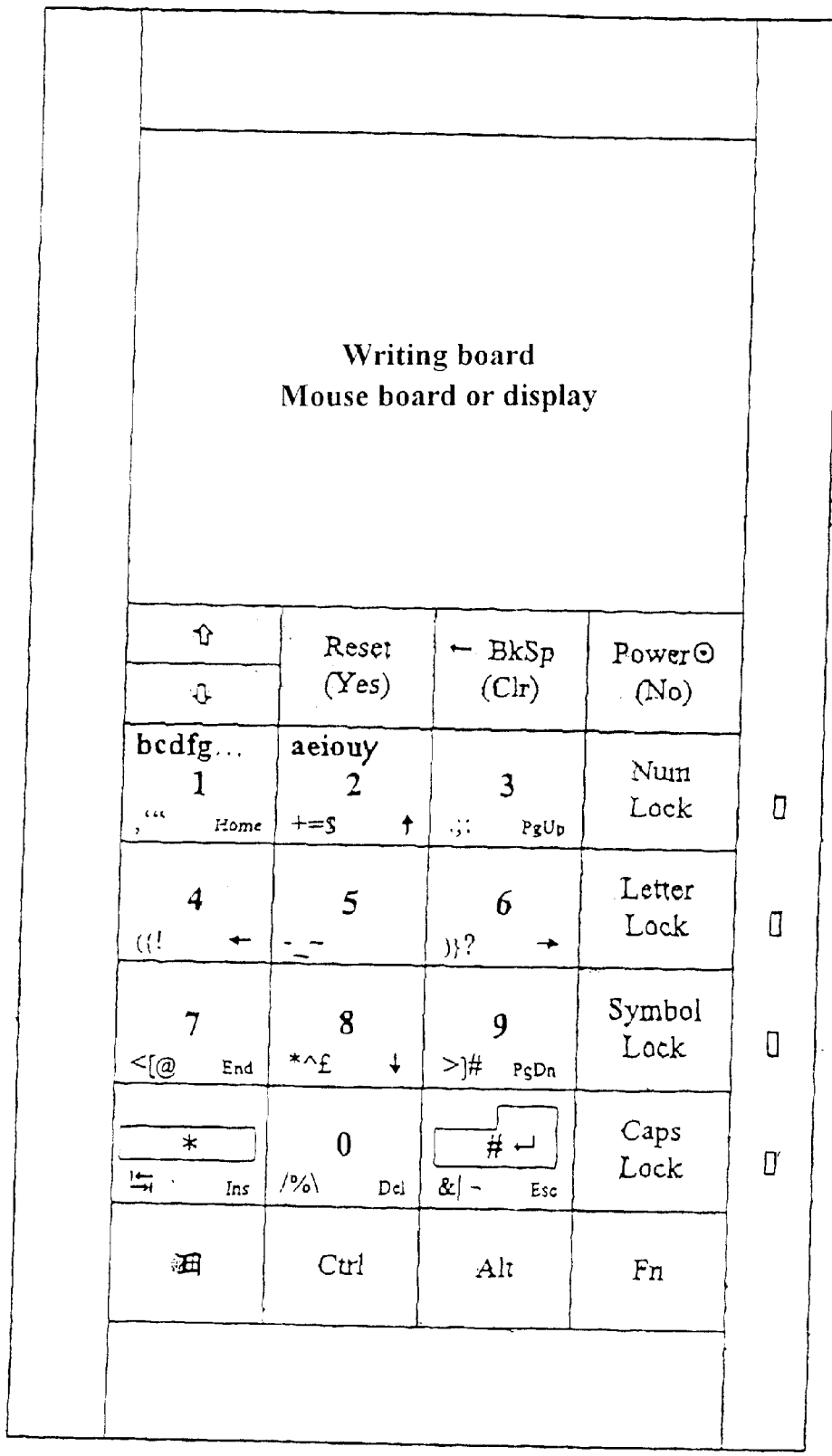
FIG. 4 is a sketch view of the common 2-code simple keyboard panel of the present invention.

A further preferred embodiment of the present invention is the common 2-code simple keyboard. FIG. 4 is a sketch view of the common 2-code simple keyboard panel. The said keyboard panel includes the touchable writing board on the top, the mouse board and the display screen. In order to be used in telephone, computer, TV, all the functions of the present common computer keyboard are integrated in to the multi-function keys, as shown in the following table. Key name Main letter and symbol Else symbol Control key

| Key name | Main letter and symbol | Else symbol | Control key |
| --- | --- | --- | --- |
| 1 | B, C, D, F, G, H, J, K, L, M, N, P, Q, R, S, T, V, W, X, Z | ., ', " | Home |
| 2 | A, E, I, O, U, Y | +, =, $ | ↑ |
| 3 | | ., ;, : | PgUp |
| 4 | | (, {, ! | ← |
| 5 | | -, —, ~ | |
| 6 | | ), }, ? | → |
| 7 | | <, [, @ | End |
| 8 | | *, ^, £ | ↓ |
| 9 | | >, ], # | PgDn |
| 0 | | /, %, \ | Del |
| * | Space Bar | TAB, ' | Ins |
| # | Enter↵ | &, \|, ¬ | Esc |

In which the mathematical operation symbols +, −, *, / are arranged on the position of the keys 2, 5, 8, 0 in the middle row in turn, and the said simple keyboard also includes Windows icon, function keys Ctrl, Alt, Fn (which may be combined with the multi-functional keys), reset key Reset (Yes), delete key Bksp (Clr), switch key Power (No), up and down roll key ⇧⇩, and the option key: numeral state switch key NumLock, letter state switch key Letter Lock, symbol state switch key Symbol Lock, capitalized letter state switch key CapsLock, etc. (which can be switched to different input states according to requirement).

The most preferred 2-code English word encoding and the most preferred English letter key arrangement are shown in the following table: (the repetition rate of the English word in the said embodiment is 34.53%)

| Selected encoding symbol | English letter group with same code | position name of the key | using frequency of the code |
| --- | --- | --- | --- |
| T | B, C, D, F, G, H, J, K, L, M, N, P, Q, R, S, T, V, W, X, Z | 1 | 59.27% |
| A | A, E, I, O, U, Y | 2 | 40.73% |

The second row in the above table is a list of the English letter group having the same code in the most preferred English word encoding, the said letter group list is the kernel of the most preferred English word encoding. The most preferred keyboard arrangement of the English letters is shown in the second and third rows in the above table.

The encoding symbols in the first row of the above table are the letters having the highest using frequency in the letter group of the same line, however, the encoding symbols can be replaced by numerals or symbols without affecting the kernel content of the most preferred English word encoding.

According to the above English letter arrangement, the simple keyboard of the phone set and the computer, and the common simple keyboard can be designed (the simple keyboard disclosed in the said embodiment are shown in FIG. 4). The above keyboard also includes such symbols as punctuation, control symbol, to achieve the various functions required by the said electronic products.

Figure 5:
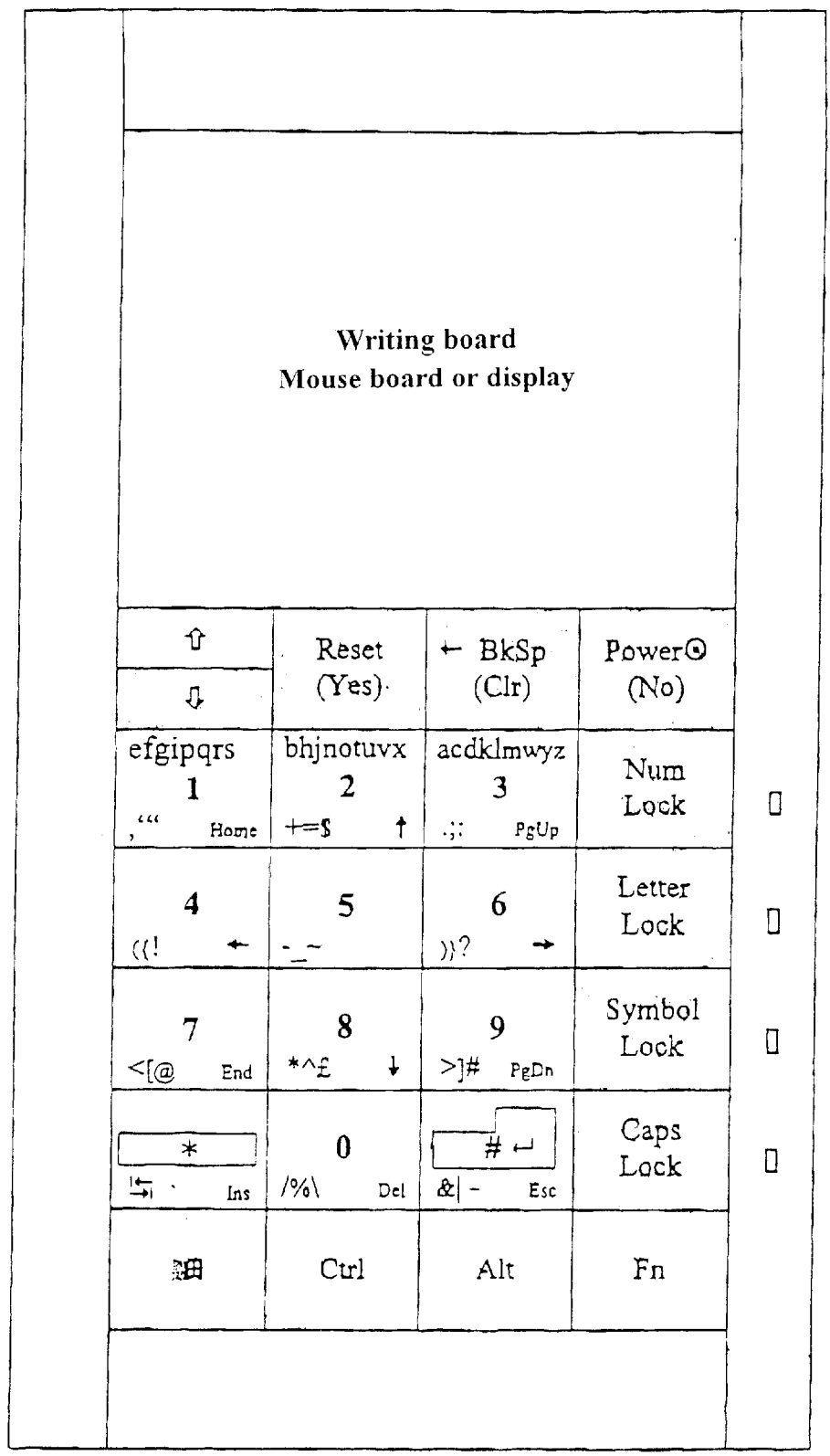
FIG. 5 is a sketch view of the common 3-code simple keyboard panel of the present invention.

A further preferred embodiment of the present invention is the common 3-code simple keyboard. FIG. 5 is a sketch view of the common 3-code simple keyboard panel. The said keyboard panel includes the touchable writing board on the top, the mouse board and the display screen. In order to be used in telephone, computer, TV, all the functions of the present common computer keyboard are integrated into the multi-function keys, as shown by in following table.

| Key name | Main letter and symbol | Else symbol | Control key |
| --- | --- | --- | --- |
| 1 | E, F, G, I, P, Q, R, S | ., ', " | Home |
| 2 | B, H, J, N, O, T, U, V, X | +, =, $ | ↑ |
| 3 | A, C, D, K, L, M, W, Y, Z | ., ;, : | PgUp |
| 4 | | (, {, ! | ← |
| 5 | | -, —, ~ | |
| 6 | | ), }, ? | → |
| 7 | | <, [, @ | End |
| 8 | | *, ^, £ | ↓ |
| 9 | | >, ], # | |
| 0 | | /, %, \ | Del |
| * | Space Bar | TAB, ' | Ins |
| # | Enter↵ | &, \|, ¬ | Esc |

In which the mathematical operation symbols +, −, *, / are arranged on the position of the keys 2, 5, 8, 0 in the middle row in turn, and the said simple keyboard also includes Windows icon, function keys Ctrl, Alt, Fn (which may be combined with the multi-functional keys), reset key Reset (Yes), delete key Bksp (Clr), switch key Power (No), up and down roll key ⇧⇩, and the option key: numeral state switch key NumLock, letter state switch key Letter Lock, symbol state switch key Symbol Lock, capitalized letter state switch key CapsLock, etc. (which can be switched to different input states according to requirement).

The most preferred 3-code English word encoding and the most preferred English letter key arrangement are shown in the following table: (the repetition rate of the English word in the said embodiment is 16.30%)

| selected encoding symbols | English letter group with same code | position name of the key | using frequency of the code |
|---|---|---|---|
| E | E, F, G, I, P, Q, R, S | 1 | 39.74% |
| T | B, H, J, N, O, T, U, V, X | 2 | 32.55% |
| A | A, C, D, K, L, M, W, Y, Z | 3 | 27.71% |

The second row in the above table is a list of the English letter group Having the same code in the most preferred English word encoding, the said letter group list is the kernel of the most preferred English word encoding. The most preferred keyboard arrangement of the English letters is shown in the second and third rows in the above table.

The encoding symbols in the first row of the above table are the letters having the highest using frequency in the letter group of the same line, however, the encoding symbols can be replaced by numerals or symbols without affecting the kernel content of the most preferred English word encoding.

According to the above English letter arrangement, the simple keyboard of the phone set and the computer, and the common simple keyboard can be designed (the simple keyboard disclosed in the said embodiment are shown in FIG. 5). The above keyboard also includes such symbols as punctuation, control symbol, to achieve the various functions required by the said electronic products.

Figure 6:
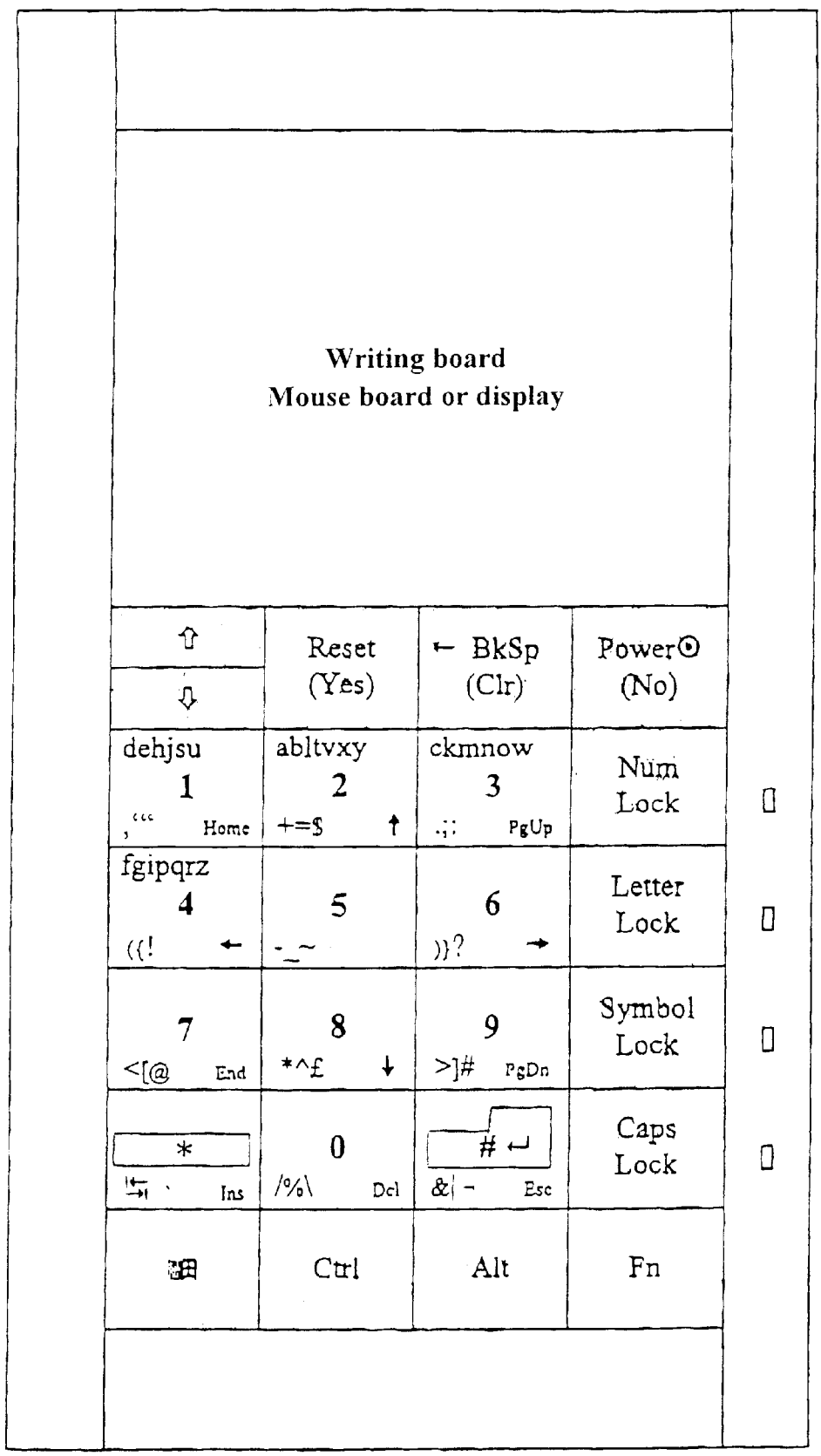
FIG. 6 is a sketch view of the common 4-code simple keyboard panel of the present invention.

A further preferred embodiment of the present invention is the common 4-code simple keyboard. FIG. 6 is a sketch view of the common 4-code simple keyboard panel. The said keyboard panel includes the touchable writing board on the top, the mouse board and the display screen. In order to be used in telephone, computer, TV, all the functions of the present common computer keyboard are integrated into the multi-function keys, as shown by in following table.

| Key name | Main letter and symbol | Else symbol | Control key |
|---|---|---|---|
| 1 | D, E, H, J, S, U | ., ', " | Home |
| 2 | A, B, L, T, V, X, Y | +, =, $ | ↑ |
| 3 | C, K, M, N, O, W | ., :, : | PgUp |
| 4 | F, G, I, P, Q, R, Z | (, {, ! | ← |
| 5 | | -, —, ~ | |
| 6 | | ), }, ? | → |
| 7 | | <, [, @ | End |
| 8 | | *, , £ | ↓ |
| 9 | | >, ], # | PgDn |
| 0 | | /, %, \ | Del |
| * | Space Bar | TAB, ' | Ins |
| # | Enter↵ | &, \|, ¬ | Esc |

In which the mathematical operation symbols +, −, 8, / are arranged on the position of the keys 2, 5, 8, 0 in the middle row in turn, and the said simple keyboard also includes Windows icon, function keys Ctrl, Alt, Fn (which may be combined with the multi-functional keys), reset key Reset (Yes), delete key Bksp (Clr), switch key Power (No), up and down roll key ⇧⇩, and the option key: numeral state switch key NumLock, letter state switch key Letter Lock, symbol state switch key Symbol Lock, capitalized letter state switch key CapsLock, etc. (which can be switched to different input states according to requirement)

The most preferred 4-code English word encoding and the most preferred English letter key arrangement are shown in the following table: (the repetition rate of the English word in the said embodiment is 10.79%)

| Selected encoding symbols | English letter group with same code | position name of the key | using frequency of the code |
|---|---|---|---|
| E | D, E, H, J, S, U | 1 | 27.16% |
| A | A, B, L, T, V, X, Y | 2 | 26.76% |
| O | C, K, M, N, O, W | 3 | 23.56% |
| I | F, G, I, P, Q, R, Z | 4 | 22.51% |

The second row in the above table is the list of the English letter group having same code in the most preferred English word encoding, the said letter group list is the kernel of the most preferred English word encoding. The most preferred keyboard arrangement of the English letter is shown in the second and third rows in the above table.

The encoding symbols in the first row of the above table are the letters having the highest using frequency in the letter group of the same line, however, the encoding symbols can be replaced by numerals or symbols without affecting the kernel content of the most preferred English word encoding.

According to the above English letter arrangement, the simple keyboard of the phone set and the computer, and the common simple keyboard can be designed (the simple keyboard disclosed in the said embodiment are shown in FIG. 6). The above keyboard also includes such symbols as punctuation, control symbol, to achieve the various functions required by the said electronic products.

Figure 7:
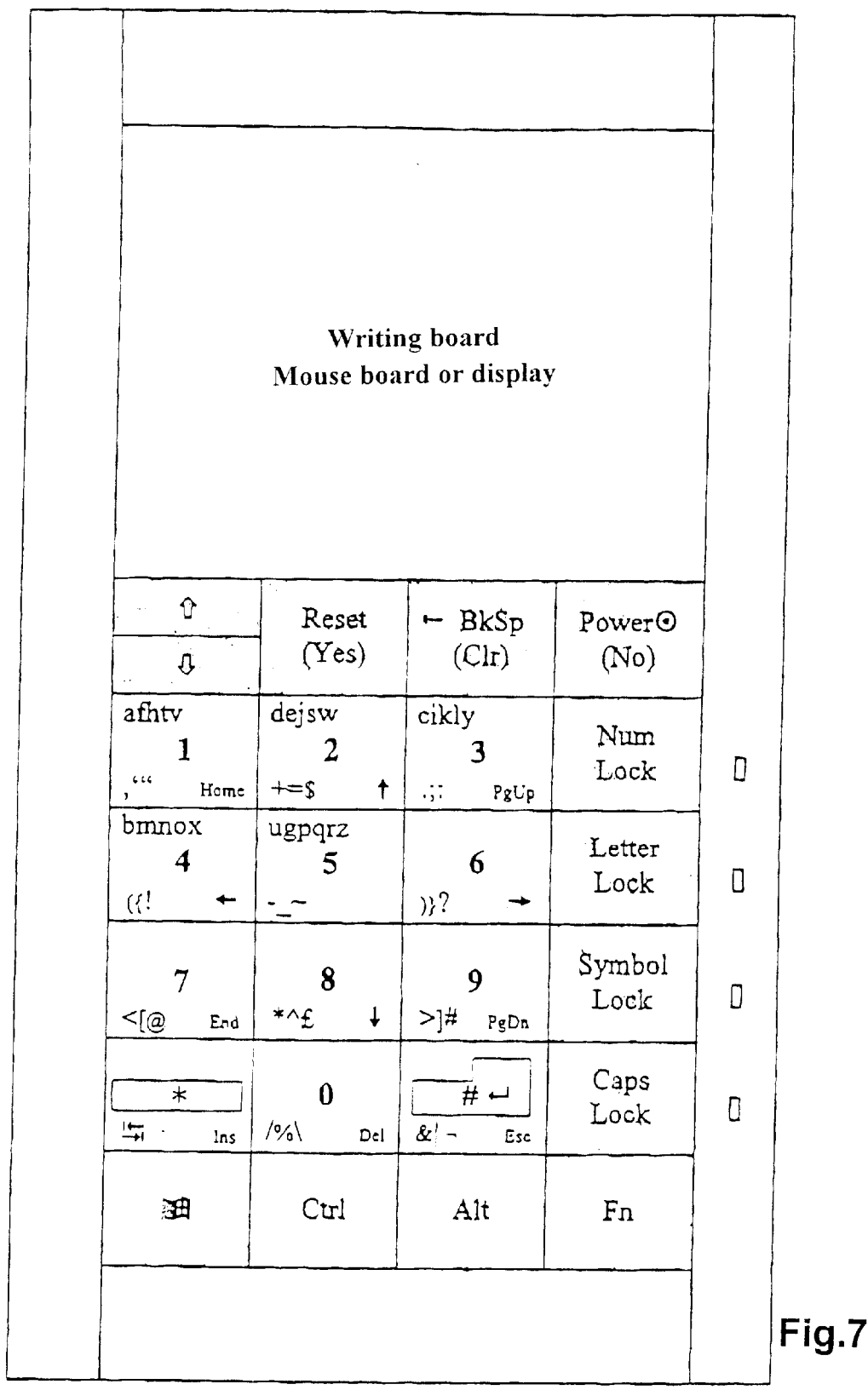
FIG. 7 is a sketch view of the common 5-code simple keyboard panel of the present invention.

A further preferred embodiments of the present invention is the common 5-code simple keyboard. FIG. 7 is a sketch view of the common 5-code simple keyboard panel. The said keyboard panel includes the touchable writing board on the top, the mouse board and the display screen. In order to be used in telephone, computer, TV, all the functions of the present common computer keyboard are integrated into the multi-functional keys, as shown in the following table.

| Key name | Main letter and symbol | Else symbol | Control key |
|---|---|---|---|
| 1 | A, F, H, T, V | ., ', " | Home |
| 2 | D, E, J, S, W | +, =, $ | ↑ |
| 3 | C, I, K, L, Y | ., :, : | PgUp |
| 4 | D, M, N, O, X | (, {, ! | ← |
| 5 | U, G, P; Q, R, Z | -, —, ~ | |
| 6 | | ), }, ? | → |
| 7 | | <, [, @ | End |
| 8 | | *, , £ | ↓ |
| 9 | | >, ], # | PgDn |
| 0 | | /, %, \ | Del |
| * | Space Bar | TAB, ' | Ins |
| # | Enter↵ | &, \|, ¬ | Esc |

In which the mathematical operation symbols +, −, *, / are arranged on the position of the keys 2, 5, 8, 0 in the middle row in turn, and the said simple keyboard also includes Windows icon, function keys Ctrl, Alt, Fn (which may be combined with the multi-functional keys), reset key Reset (Yes), delete key Bksp (Clr), switch key Power (No), up and down roll key ⇧⇩ and the option key: numeral state switch key NumLock, letter state switch key Letter Lock, symbol state switch key Symbol Lock, capitalized letter state switch key CapsLock, etc. (which can be switched to different input states according to the requirement).

The most preferred 5-code English word encoding and the most preferred English letter key arrangement are shown in the following table: the repetition rate of the English word in the said embodiment is 7.46%)

| selected encoding symbols | English letter group with same code | position name of the key | using frequency of the code |
|---|---|---|---|
| A | A, F, H, T, V | 1 | 22.05% |
| E | D, E, J, S, W | 2 | 22.01% |
| I | C, I, K, L, Y | 3 | 20.00% |
| O | B, N, O, X | 4 | 19.57% |
| R | U, G, P, Q, R, Z | 5 | 16.36% |

The second row in the above table is the list of the English letter group having the same code in the most preferred English word encoding, the said letter group list is the kernel of the most preferred English word encoding. The most preferred keyboard arrangement of the English letter is shown in the second and third rows in the above table.

The encoding symbols in the first row of the above table are the letters having the highest using frequency in the letter group of the same line, however, the encoding symbols can be replaced by numerals or symbols without affecting the kernel content of the most preferred English word encoding.

According to the above English letter arrangement, the simple keyboard of the phone set and the computer, and the common simple keyboard can be designed (the simple keyboard disclosed in the said embodiment are shown in FIG. 7). The above keyboard also includes such symbols as punctuation, control symbol, to achieve various functional keys required by the said electronic products.

| Key name | Main letter and symbol | Else symbol | Control key |
|---|---|---|---|
| 1 | E, J, M, S | ., ', " | Home |
| 2 | G I, P, Q, R | +, =, $ | ↑ |
| 3 | F, O, T, Z | ., :, : | PgUp |
| 4 | B, H, N, U | (, {, ! | ← |
| 5 | A, D, V, W | -, —, ~ | |
| 6 | C, K, L, X, Y | ), }, ? | → |
| 7 | | <, [, @ | End |
| 8 | | *, ', £ | ↓ |
| 9 | | >, ], # | PgDn |
| 0 | | /, %, \ | Del |
| * | Space Bar | TAB, ' | Ins |
| # | Enter↵ | &, \|, ¬ | Esc |

In which the mathematical operation symbols +, −, *, / are arranged on the position of the keys 2, 5, 8, 0 in the middle row in turn, and the said simple keyboard also includes Windows icon, function keys Ctrl, Alt, Fn (which may be combined with the multi-functional keys), reset key Reset (Yes), delete key Bksp (Clr), switch key Power (No), up and down roll key ⇧⇩, and the option key: numeral state switch key NumLock, letter state switch key Letter Lock, symbol state switch key Symbol Lock, capitalized letter state switch key CapsLock, etc. (which can be switched to different input states according to the requirement).

The most preferred 6-code English word encoding and the most preferred English letter key arrangement are shown in the following table: (the repetition rate of the English word in the said embodiment is 5.18%)

| Selected encoding symbols | English letter group with same code | position name of the key | using frequency of the code |
|---|---|---|---|
| e | E, J, M, S | 1 | 20.32% |
| i | G, I, P, Q, R | 2 | 20.30% |
| o | F, O, T, Z | 3 | 17.80% |
| n | B, H, N, U | 4 | 15.33% |
| a | A, D, V, W | 5 | 13.72% |
| l | C, K, L, X, Y | 6 | 12.53% |

The second row in the above table is the list of the English letter group having the same code in the most preferred English word encoding, the said letter group list is the kernel of the most preferred English word encoding. The most preferred keyboard arrangement of the English letter is shown in the second and third rows in the above table.

The encoding symbols in the first row of the above table are the letters having the highest using frequency in the letter group of the same line, however, the encoding symbols can be replaced by numerals or symbols without affecting the kernel content of the most preferred English word encoding.

Figure 8:
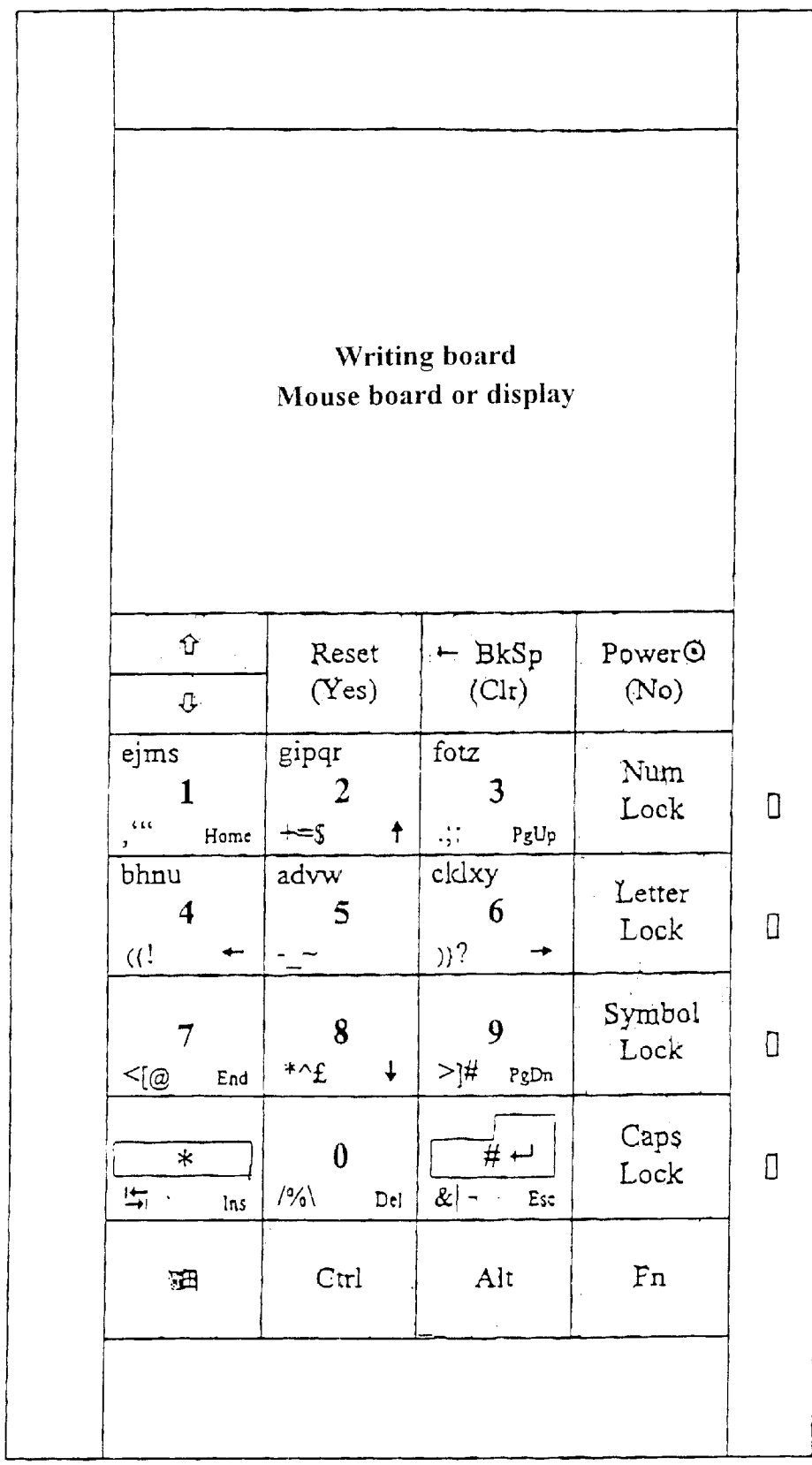
FIG. 8 is a sketch view of the common 6-code simple keyboard panel of the present invention.

According to the above English letter arrangement, the simple keyboard of the phone set and the computer, and the common simple keyboard can be designed (the simple keyboard disclosed in the said embodiment are shown in FIG. 8). The above keyboard also includes such symbols as punctuation, control symbol, to achieve various functions required by the said electronic products.

Figure 9:
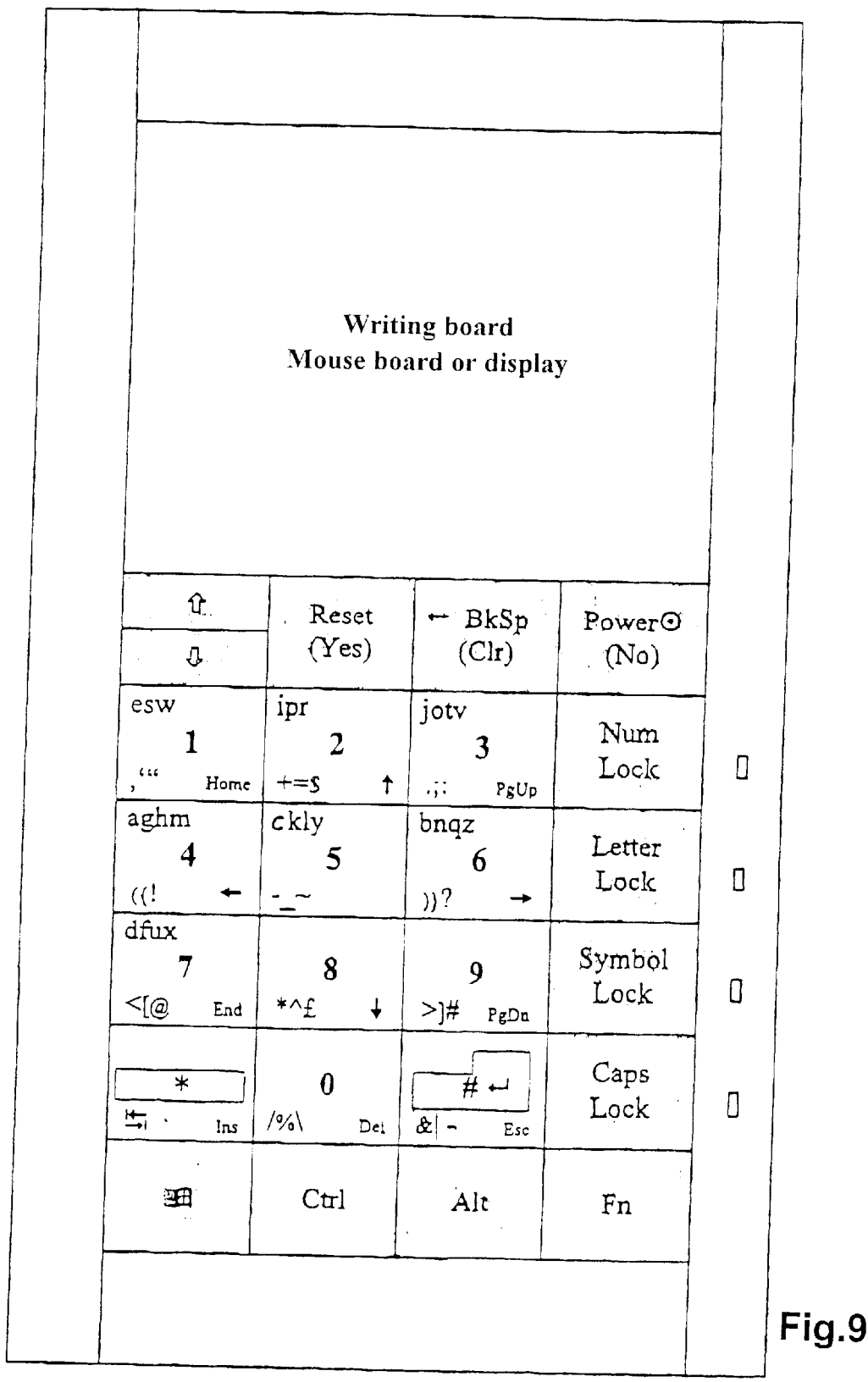
FIG. 9 is a sketch view of the common 7-code simple keyboard panel of the present invention.

A further preferred embodiments of the present invention is the common 7-code simple keyboard. FIG. 9 is a sketch view of the common 7-code simple keyboard panel. The said keyboard panel includes the touchable writing board on the top, the mouse board and the display screen. In order to be used in telephone, computer, TV, all the functions of the common present computer keyboard are integrated into the multi-functional keys, as shown in the following table.

| Key name | Main letter and symbol | Else symbol | Control key |
|---|---|---|---|
| 1 | E, S, W | ., ', " | Home |
| 2 | I, P, R | +, =, $ | ↑ |
| 3 | J, O, T, V | ., :, : | PgUp |
| 4 | A, G, H, M | (, {, ! | ← |
| 5 | C, K, L, Y | -, —, ~ | |
| 6 | B, N, Q, Z | ), }, ? | → |
| 7 | D, F, U, X | <, [, @ | End |
| 8 | | *, ', £ | ↓ |
| 9 | | >, ], # | PgDn |
| 0 | | /, %, \ | Del |
| * | Space Bar | TAB, ' | Ins |
| # | Enter↵ | &, \|, ¬ | Esc |

In which the mathematical operation symbols +, −, *, / are arranged on the position of the keys 2, 5, 8, 0 in the middle row in turn, and the said simple keyboard also includes Windows icon, function keys Ctrl, Alt, Fn (which may be combined with the multi-functional keys), reset key Reset (Yes), delete key Bksp (Clr), switch key Power (No), up and down roll key ⇧⇩, and the option key: numeral state switch key NumLock, letter state switch key Letter Lock, symbol state switch key Symbol Lock, capitalized letter state switch key CapsLock, etc. (which can be switched to different input states according to the requirement).

The most preferred 7-code English word encoding and the most preferred English letter key arrangement are shown in the following table: the repetition rate of the English word in the said embodiment is 3.98%)

| Selected encoding symbols | English letter group with same code | position name of the key | using frequency of the code |
|---|---|---|---|
| e | E, S, W | 1 | 18.58% |
| i | I, P, R | 2 | 17.85% |
| t | J, O, T, V | 3 | 16.92% |
| a | A, G, H, M | 4 | 15.80% |
| c | C, K, L, Y | 5 | 12.24% |
| n | B, N, Q, Z | 6 | 9.38% |
| u | D, F, U, X | 7 | 9.23% |

The second row in the above table is the list of the English letter group having same code in the most preferred English word encoding, the said letter group list is the kernel of the most preferred English word encoding. The most preferred keyboard arrangement of the English letter is shown in the second and third rows in the above table.

The encoding symbols in the first row of the above table are the letters having the highest using frequency in the letter group of the same line, however, the encoding symbols can be replaced by numerals or symbols without affecting the kernel content of the most preferred English word encoding.

According to the above English letter arrangement, the simple keyboard of the phone set and the computer, and the common simple keyboard and can be designed (the simple keyboard disclosed in the said embodiment are shown in FIG. 9). The above keyboard also includes such symbols as punctuation, control symbol, to achieve the various functions required by the said electronic products.

Figure 10:
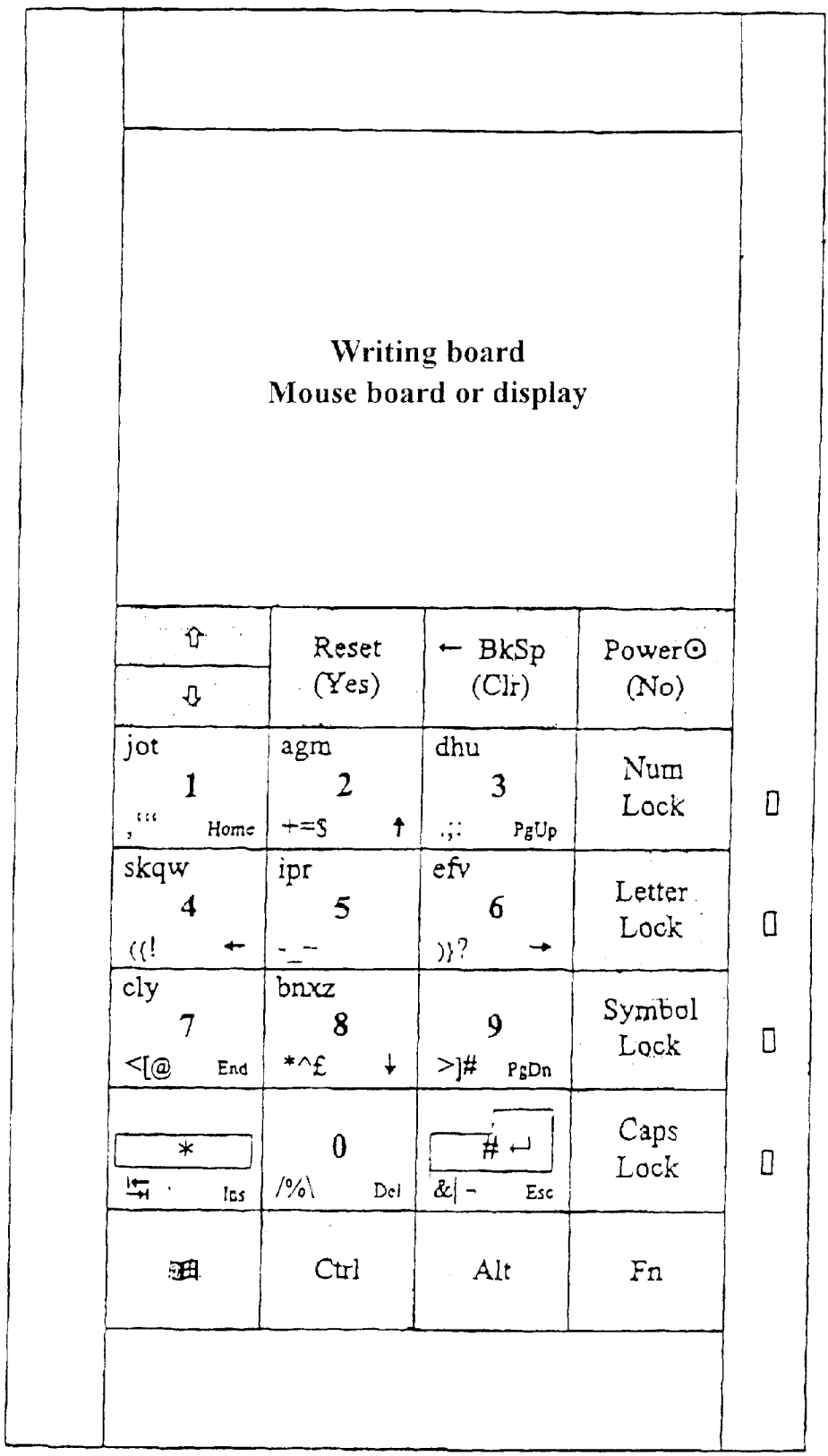
FIG. 10 is a sketch view of the common 8-code simple keyboard panel of the present invention.

A further preferred embodiments of the present invention is the common 8-code simple keyboard. FIG. 10 is a sketch view of. the common 8-code simple keyboard panel. The said keyboard panel includes the touchable writing board on the top, the mouse board and the display screen. In order to be used in telephone, computer, the TV, all the functions of the common present computer keyboard are integrated into the multi-functional keys, as shown in the following table.

| Key name | Main letter and symbol | Else symbol | Control key |
|---|---|---|---|
| 1 | J, O, T | ., ', " | Home |
| 2 | A, G, M | +, =, $ | ↑ |
| 3 | D, H, U | ., ;, : | PgUp |
| 4 | S, K, Q, W | (, {, ! | ← |
| 5 | I, P, R | -, —, ~ | |
| 6 | E, F, V | ), }, ? | → |
| 7 | C, L, Y | <, [, @ | End |
| 8 | B, N, X, Z | *, , £ | ↓ |
| 9 | | >, ], # | PgDn |
| 0 | | /, %, \ | Del |
| * | Space Bar | TAB, ' | Ins |
| # | Enter↵ | &, \|, ¬ | Esc |

In which the mathematical operation symbols +, −, *, / are arranged on the position of the keys 2, 5, 8, 0 in the middle row in turn, and the said simple keyboard also includes Windows icon, function keys Ctrl, Alt, Fn (which may be combined with the multi-functional of keys), reset key Reset (Yes), delete key Bksp (Clr), switch key Power (No), up and down roll key ↑↓, and the option key: number state switch key NumLock, letter state switch key Letter Lock, symbol state switch key Symbol Lock, capitalized letter state switch key CapsLock, etc. (which can be switched to different input states according to the requirement).

The most preferred 8-code English word encoding and the most preferred English letter key arrangement are shown in the following table: (the repetition rate of the English word in the said embodiment is 2.93%)

| selected encoding symbols | English letter group with same code | Position name of the key | using frequency of the code |
|---|---|---|---|
| t | J, O, T | 1 | 15.74% |
| a | A, G, M | 2 | 13.12% |
| u | D, H, U | 3 | 9.59% |
| s | S, K, Q, W | 4 | 7.94% |
| i | I, P, R | 5 | 17.85% |
| e | E, F, V | 6 | 14.97% |
| c | C, L, Y | 7 | 11.29% |
| n | B, N, X, Z | 8 | 9.50% |

The second row in the above table is the list of the English letter group having same code in the most preferred English word encoding, the said letter group list is the kernel of the most preferred English word encoding. The most preferred keyboard arrangement of the English letter is shown in the second and third rows in the above table.

The encoding symbols in the first row of the above table are the letters having the highest using frequency in the letter group of the same line, however, the encoding symbols can be replaced by numerals or symbols without affecting the kernel content of the most preferred English word encoding.

According to the above English letter arrangement, the simple keyboard of the phone set and the computer, and the common simple keyboard and can be designed (the simple keyboard disclosed in the said embodiment are shown in FIG. 10). The above keyboard also includes such symbols as punctuation, control symbol, to achieve the various functions required by the said electronic products.

Figure 11:
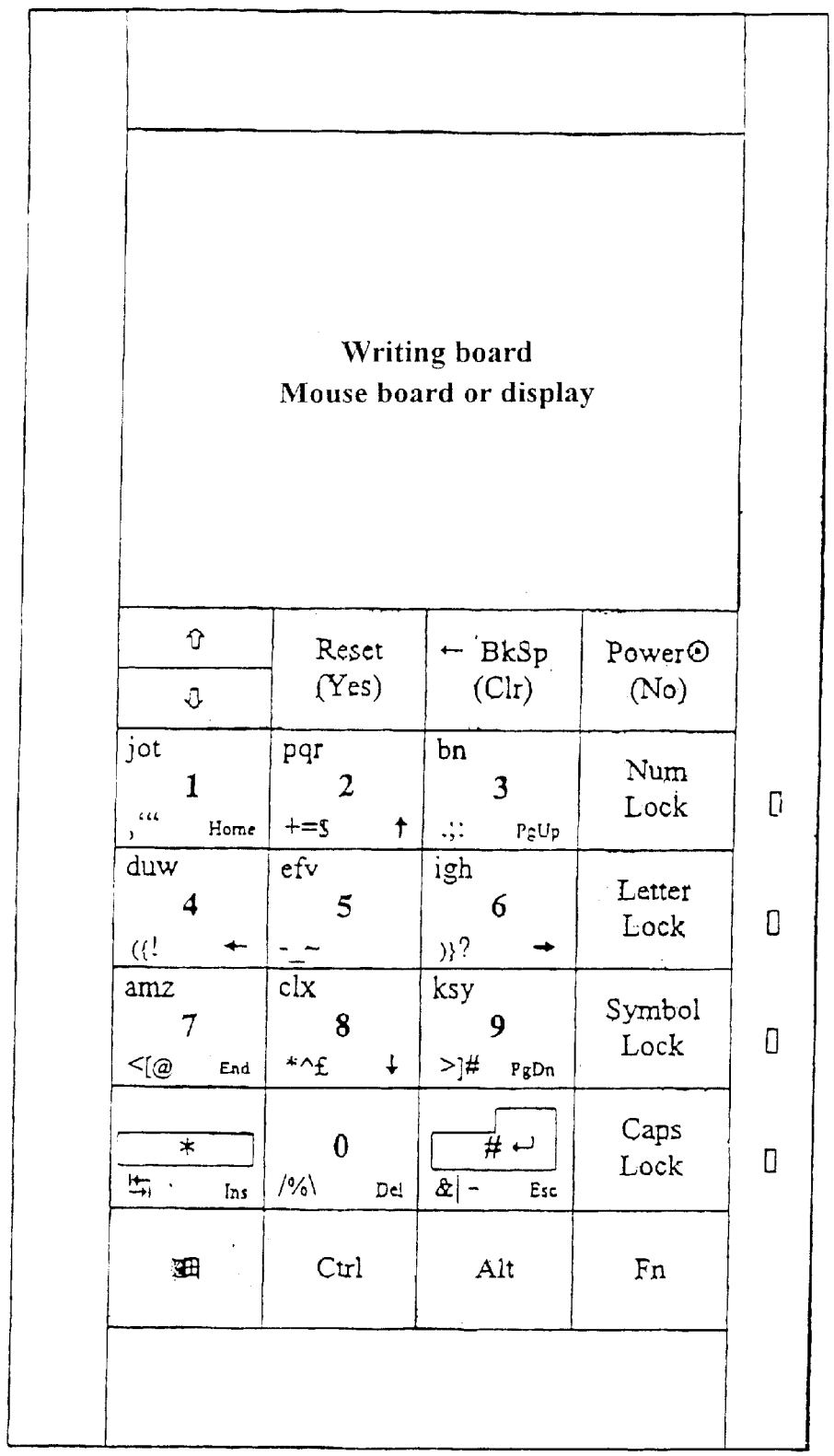
FIG. 11 is a sketch view of the common 9-code simple keyboard panel of the present invention.

A further preferred embodiments of the present invention is the common 9-code simple keyboard. FIG. 11 is a sketch view of the common 9-code simple keyboard panel. The said keyboard panel includes the touchable writing board on the top, the mouse board and the display screen. In order to be used in telephone, computer, TV, all the functions of the common present computer keyboard are integrated into the multi-functional keys, as shown by the following table.

| Key name | Main letter and symbol | Else symbol | Control key |
|---|---|---|---|
| 1 | J, O, T | ., ', " | Home |
| 2 | P, Q, R | +, =, $ | ↑ |
| 3 | B, N | ., ;, : | PgUp |
| 4 | D, U, W | (, {, ! | ← |
| 5 | E, F, V | -, —, ~ | |
| 6 | G, H, I | ), }, ? | → |
| 7 | A, M, Z | <, [, @ | End |
| 8 | C, L, X | *, , £ | ↓ |
| 9 | K, S, Y | >, ], # | PgDn |
| 0 | | /, %, \ | Del |
| * | Space Bar | TAB, ' | Ins |
| # | Enter↵ | &, \|, ¬ | Esc |

In which the mathematical operation symbols +, −, *, / are arranged on the position of the keys 2, 5, 8, 0 in the middle row in turn, and the said simple keyboard also includes Windows icon, function keys Ctrl, Alt, Fn (which may be combined with the multi-functional keys), reset key Reset (Yes), delete key Bksp (Clr), switch key Power (No), up and down roll key, and the option key: numeral state switch key NumLock, letter state switch key Letter Lock, symbol state switch key Symbol Lock, capitalized letter state switch key CapsLock, etc. (which can be switched to different input states according to the requirement).

The most preferred 9-code English word encoding and the most preferred English letter key arrangement are shown in the following table: (the repetition rate of the English word in the said embodiment is 2.23%)

| Selected encoding symbols | English letter group with same code | Position name of the key | using frequency of the code |
|---|---|---|---|
| t | J, O, T | 1 | 15.74% |
| r | P, Q, R | 2 | 10.26% |
| n | B, N | 3 | 9.02% |
| u | D, U, W | 4 | 8.08% |
| e | E, F, V | 5 | 14.97% |
| i | G, H, I | 6 | 12.71% |
| a | A, M, Z | 7 | 11.03% |
| l | C, L, X | 8 | 9.65% |
| s | K, S, Y | 9 | 8.53% |

The second row in the above table is a list of the English letter group having same code in the most preferred English word encoding, the said letter group list is the kernel of the most preferred English word encoding. The most preferred keyboard arrangement of the English letter is shown in the second and third rows in the above table.

The encoding symbols in the first row of the above table are the letters having the highest using frequency in the letter group of the same line, however, the encoding symbols can be replaced by numbers or symbols without affecting the kernel content of the most preferred English word encoding.

According to the above English letter arrangement, the simple keyboard of the phone set and the computer, and the common simple keyboard and can be designed (the simple keyboard disclosed in the said embodiment are shown in FIG. 11). The above keyboard also includes such symbols as punctuation, control symbol, to achieve the various functions required by the said electronic products.

Figure 13:
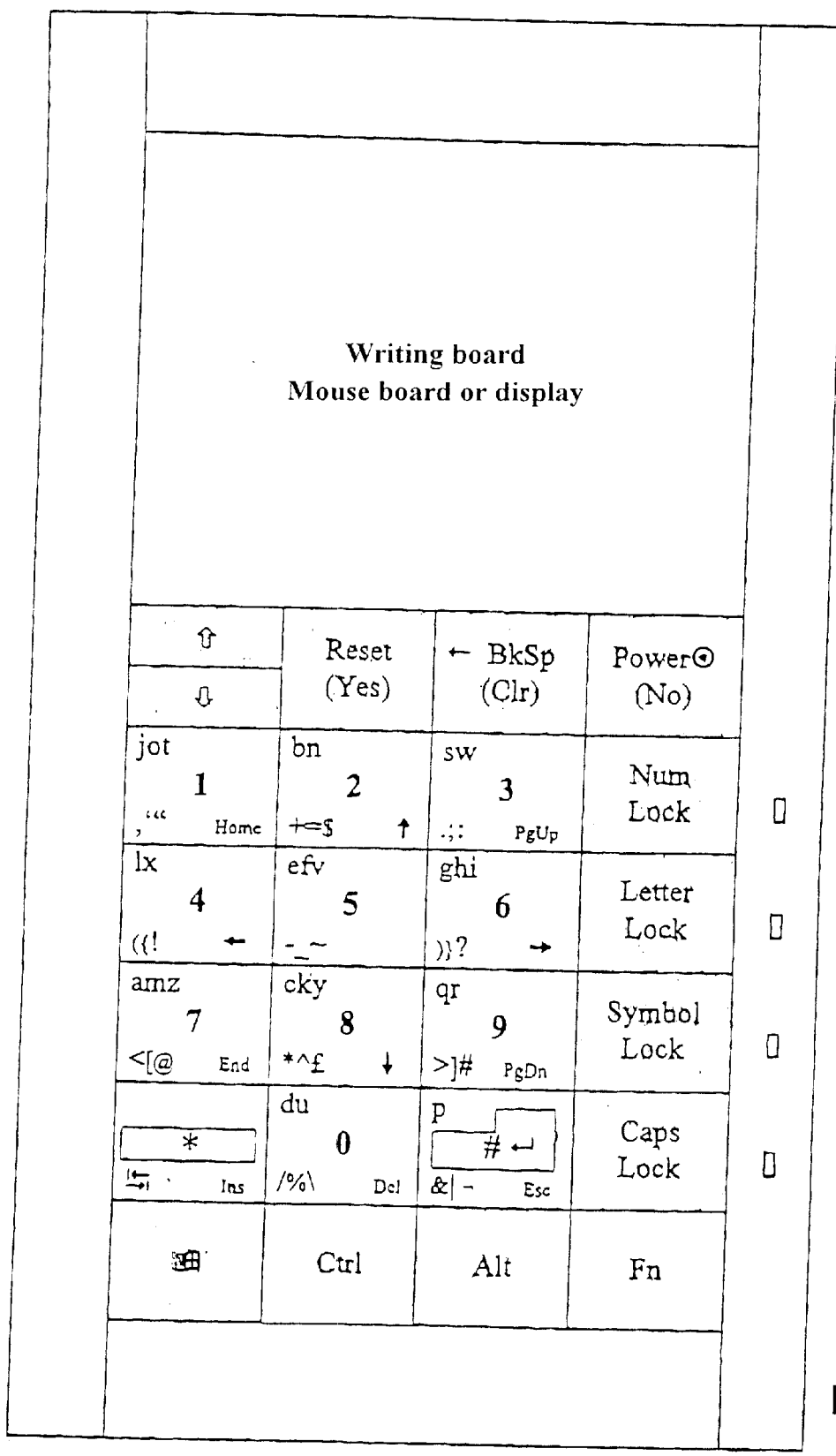
FIG. 13 is a sketch view of the common 11-code simple keyboard panel of the present invention.

A further preferred embodiments of the present invention is the common 11-code simple keyboard. FIG. 13 is a sketch view of the common 11-code simple keyboard panel. The said keyboard panel includes the touchable writing board on the top, the mouse board and the display screen. In order to be used in telephone, computer, TV, all the functions of the common present computer keyboard are integrated into the multi-function keys, as shown in the following table.

| Key name | Main letter and symbol | Else symbol | Control key |
|---|---|---|---|
| 1 | J, O, T | ., ', " | Home |
| 2 | B, N | +, =, $ | ↑ |
| 3 | S, W | ., ;, : | PgUp |
| 4 | L, X | (, {, ! | ← |
| 5 | E, F, V | -, →, ~ | |
| 6 | G, H, I | ), }, ? | → |
| 7 | A, M, Z | <, [, @ | End |
| 8 | C, K, Y | *, , £ | ↓ |

-continued

| Key name | Main letter and symbol | Else symbol | Control key |
|---|---|---|---|
| 9 | Q, R | >, ], # | PgDn |
| 0 | D, U | /, %, \ | Del |
| * | Space Bar | TAB, ' | Ins |
| # | P, Enter↵ | &, \|, ¬ | Esc |

In which the mathematical operation symbols +, −, *, / are arranged on the position of the keys 2, 5, 8, 0 in the middle row in turn, and the said simple keyboard also includes Windows icon, function keys Ctrl, Alt, Fn (which may be combined with the multi-functional keys), reset key Reset (Yes), delete key Bksp (Clr), switch key Power (No), up and down roll key ⇑⇓, and the option key: number state switch key NumLock, letter state switch key Letter Lock, symbol state switch key Symbol Lock, capitalized letter state switch key CapsLock, etc. (which can be switched to different input states according to the requirement).

The most preferred 11-code English word encoding and the most preferred English letter key arrangement are shown in the following table: (the repetition rate of the English word in the said embodiment is 1.29%)

| Selected encoding symbols | English letter group with same code | Position name of the key | using frequency of the code |
|---|---|---|---|
| t | J, O, T | 1 | 15.74% |
| n | B, N | 2 | 9.02% |
| s | S, W | 3 | 6.81% |
| l | L, X | 4 | 5.51% |
| e | E, F, V | 5 | 14.97% |
| i | G, H, I | 6 | 12.71% |
| a | A, M, Z | 7 | 11.03% |
| c | C, K, Y | 8 | 7.02% |
| r | Q, R | 9 | 7.36% |
| u | D, U | 0 | 6.92% |
| p | P | * | 2.90% |

The second row in the above table is a list of the English letter group having same code in the most preferred English word encoding, the said letter group list is the kernel of the most preferred English word encoding. The most preferred keyboard arrangement of the English letter is shown in the second and third rows in the above table.

The encoding symbols in the first row of the above table are the letters having the highest using frequency in the letter group of the same line, however, the encoding symbols can be replaced by numerals or symbols without affecting the kernel content of the most preferred English word encoding.

According to the above English letter arrangement, the simple keyboard of the phone set and the computer, and the common simple keyboard and can be designed (the simple keyboard disclosed in the said embodiment are shown in FIG. 13). The above keyboard also includes such symbols as punctuation, control symbol, to achieve the various functions required by the said electronic products.

Figure 14:
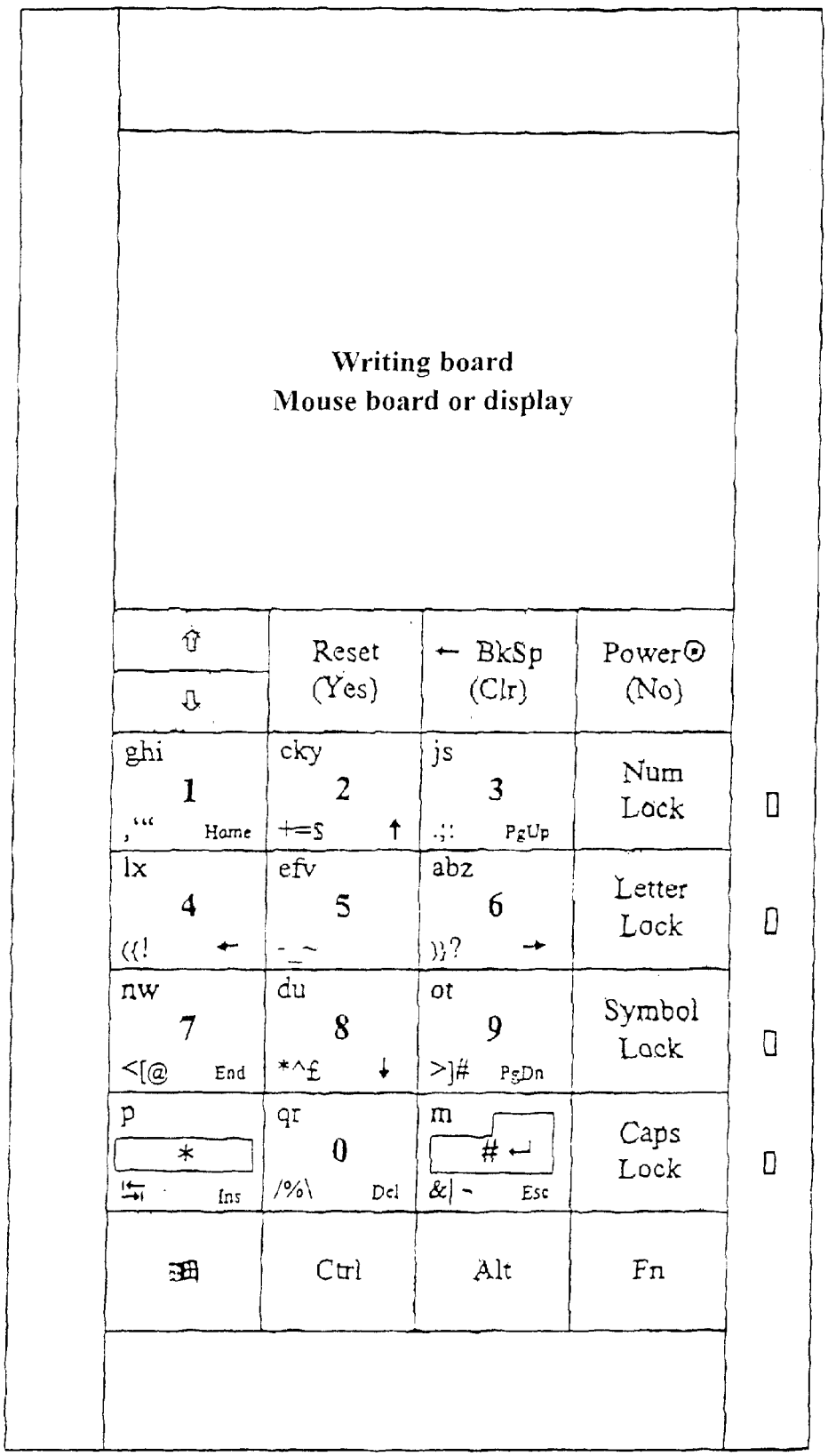
FIG. 14 is a sketch view of the common 12-code simple keyboard panel of the present invention.

A further preferred embodiments of the present invention is the common 12-code simple keyboard. FIG. 14 is a sketch view of the common 12-code simple keyboard panel. The said keyboard panel includes the touchable writing board on the top, the mouse board and the display screen. In order to be used in telephone, computer, TV, all the functions of the common present computer keyboard are integrated into the multi-functional keys, as shown in the following table.

| Key name | Main letter and symbol | Else symbol | Control key |
| --- | --- | --- | --- |
| 1 | G, H, I | ., ', " | Home |
| 2 | C, K, Y | +, =, $ | ↑ |
| 3 | J, S | ., ;, : | PgUp |
| 4 | L, X | (, {, ! | ← |
| 5 | E, F, V | -, —, ~ | |
| 6 | A, B, Z | ), }, ? | → |
| 7 | N, W | <, [, @ | End |
| 8 | D, U | *, , £ | ↓ |
| 9 | O, T | >, ], # | PgDn |
| 0 | Q, R | /, %, \ | Del |
| * | P, Space Bar | TAB, ' | Ins |
| # | M, Enter↵ | &, \|, ¬ | Esc |

In which the mathematical operation symbols +, 7 I/ are arranged on the position of the keys 2, 5, 8, 0 in the middle row in turn, and the said simple keyboard also includes Windows icon, fiction keys Ctrl, Alt, Fn (which may be combined with the multi-functional keys), reset key Reset (Yes), delete key Bksp (Clr), switch key Power (No), up and down roll key, and the option key: numeral state switch key NumLock, letter state switch key Letter Lock, symbol state switch key Symbol Lock, capitalized letter state switch key CapsLock, etc. (which can be switched to different input states according to the requirement).

The most preferred 12-code English word encoding and the most preferred English letter key arrangement are shown in the following table: (the repetition rate of the English word in the said embodiment is 0.92%)

| Selected encoding symbols | English letter group with same code | Position name of the key | using frequency of the code |
| --- | --- | --- | --- |
| i | G, H, I | 1 | 12.71% |
| c | C, K, Y | 2 | 7.02% |
| s | J, S | 3 | 5.80% |
| l | L, X | 4 | 5.51% |
| e | E, F, V | 5 | 14.97% |
| a | A, B, Z | 6 | 10.25% |
| n | N, W | 7 | 8.21% |
| u | D, U | 8 | 6.92% |
| t | O, T | 9 | 15.59% |
| r | Q, R | 0 | 7.36% |
| p | P | * | 2.90% |
| m | M | # | 2.75% |

The second row in the above table is a list of the English letter group having same code in the most preferred English word encoding, the said letter group list is the kernel of the most preferred English word encoding. The most preferred keyboard arrangement of the English letter is shown in the second and third rows in the above table.

The encoding symbols in the first row of the above table are the letters having the highest using frequency in the letter group of the same line, however, the encoding symbols can be replaced by numerals or symbols without affecting the kernel content of the most preferred English word encoding.

According to the above English letter arrangement, the simple keyboard of the phone set and the computer, and the common simple keyboard can be designed (the simple keyboard disclosed in the said embodiment are shown in FIG. 14 and 17). The above keyboard also includes such symbols as punctuation, control symbol, to achieve the various functions required by the said electronic products.

A further preferred embodiments of the present invention is the common 13-code simple keyboard. FIG. 15 is a sketch view of the common 13-code simple keyboard panel. The said keyboard panel includes the touchable writing board on the top, the mouse board and the display screen. In order to be used in the telephone, the computer, the TV, all of the functions of the common present computer keyboard is integrated in the multi-functional keys, as shown in the following table.

| Key name | Main letter and symbol | Else symbol | Control key |
| --- | --- | --- | --- |
| 1 | O, T | ., ', " | Home |
| 2 | E, F | +, =, $ | ↑ |
| 3 | I, D | ., ;, : | PgUp |
| 4 | A, M | (, {, ! | ← |
| 5 | S, U | -, —, ~ | |
| 6 | Q, R | ), }, ? | → |
| 7 | J, N | <, [, @ | End |
| 8 | C, Y | *, , £ | ↓ |
| 9 | L, X | >, ], # | PgDn |
| 0 | G, H | /, %, \ | Del |
| * | P, Z, Space Bar | TAB, ' | Ins |
| # | B, K, Enter↵ | &, \|, ¬ | Esc |
| ▯ | V, W | | |

In which the mathematical operation symbols +, -, *, / are arranged on the position of the keys 2, 5, 8, 0 in the middle row in turn, and the said simple keyboard also includes Windows icon, function keys Ctrl, Alt, Fn (which may be combined with the multi-functional keys), reset key Reset (Yes), delete key Bksp (Clr), switch key Power (No), up and down roll key ↑↓, and the option key: number state switch key NumLock, letter state switch key Letter Lock, symbol state switch key Symbol Lock, capitalized letter state switch key CapsLock, etc. (which can be switched to different input state according to the requirement).

The most preferred 13-code English word encoding and the most preferred English letter key arrangement are shown in the following table: (the repetition rate of the English word in the said embodiment is 0.62%)

| Selected encoding symbols | English letter group with same code | Position name of the key | using frequency of the code |
| --- | --- | --- | --- |
| t | O, T | 1 | 15.59% |
| e | E, F | 2 | 13.80% |
| i | I, D | 3 | 11.05% |
| a | A, M | 4 | 10.85% |
| s | S, U | 5 | 9.29% |
| r | Q, R | 6 | 7.36% |
| n | J, N | 7 | 7.20% |
| c | C, Y | 8 | 6.07% |
| l | L, X | 9 | 5.51% |
| h | G, H | 0 | 4.95% |
| p | P, Z | * | 3.09% |
| b | B, K | # | 2.92% |
| v | V, W | ▯ | 2.34% |

The second row in the above table is the list of the English letter group having same code in the most preferred English word encoding, the said letter group list is the kernel of the most preferred English word encoding. The most preferred keyboard arrangement of the English letter is shown in the second and third rows in the above table.

The encoding symbols in the first row of the above table are the letters having the highest using frequency in the letter group of the same line, however, the encoding symbols can be replaced by numbers or symbols without affecting the kernel content of the most preferred English word encoding.

According to the above English letter arrangement, the simple keyboard of the phone set and the computer, and the common simple keyboard and can be designed (the simple keyboard disclosed in the said embodiment are shown in FIG. 15). The above keyboard also includes such symbols as punctuation, control symbol, to achieve the various functions required by the said electronic products.

A further preferred embodiments of the present invention is the common 10-code simple keyboard. FIG. 16 is the sketch view of the common 10-code simple keyboard panel (101/102 keys). With combination with the corresponding software, it may input the codes only with the English letter keys in the middle line, and each key, which replace the letters, is shown in the following table:

| Key name | English letter group with same code | Corresponding number key |
|---|---|---|
| S | S, W | 4 |
| N | B, N | 3 |
| R | P, Q, R | 2 |
| T | O, J, T | 1 |
| C | C, K, Y | 0 |
| D | D, U | 9 |
| E | E, F, V | 5 |
| I | I, G, H | 6 |
| A | A, M, Z | 7 |
| L | L, X | 8 |

All the English letter keys can also be used to input with the present English input method for the computer.

A further preferred embodiments of the present invention is the common 12-code simple keyboard. FIG. 17 is a sketch view of the common 12-code simple keyboard panel (101/102 keys). With combination with the corresponding software, one may input the codes only with the English letter keys in the middle line, and each letter, which is represented by a key corresponded, is shown in the following table:

| Key name | English letter group with same code | Corresponding number key |
|---|---|---|
| L | L, X | 4 |
| S | J, S | 3 |
| C | C, K, Y | 2 |
| I | G, H, I | 1 |
| R | Q, R | 0 |
| P | P | |
| M | M | |
| T | O, T | 9 |
| E | E, F, V | 5 |
| A | A, B, Z | 6 |
| N | N, W | 7 |
| D | D, U | 8 |

All the English letter keys can also be used to input with the present English input method for the computer.

The present invention also provides an English input method for the above simple keyboard. On the said simple keyboard, when it is switched to the letter input state, the user can make the normal English spelling input, according to the correct spelling of the English word and pushing the letter keys. The user can also make simplified English input, according to the English simplified inputting method (The simplified principle of the simple English input will be illustrated as follows).

The inputted codes can be read by the computer programs, and the user can real-timely search the word nearest meaning into the codes inputted from the standard word encoding Database in the built-in chip or hard disk, and list them in number on the LCD screen or on the display. The English word encoding in the present invention uses the encoding method which with lowest code repeated repetition rate, thus there is only one word in most of the word lists, and the user can make incessant input.

When there is code repetition in the word, the user can strike the corresponding key or the up and down roll key ⇧⇩ to select the desired word, according to the word number in the word list on the screen.

If there is no option in the input, the user can use all the words on the default position, and few words incorrectly selected can be reselected after input in the word list popped out automatically or manually by moving the cursor to the wrong word.

If the user wants some personal names, place names and product names, which are not included in the word list, he can use the word self-made function, and input the letter one by one. Inputting when the letter is, the strike letter key and the roll down key (⇩) at the same time. The letter selection list will appear on the position of the current cursor on the screen, and the user can strike the corresponding keys or the up and down roll keys ⇧⇩ to select the desired letter, according to the letter number on the letter list. The self-made word can be added to the user's self-made word encoding Database for repetitive use later.

The simplified principle of the English simple input method is illustrated as follows:

The simplified principle of the English simple input method is to replace the English prefix and suffix with the simplified prefix and suffix. For example, the prefix bene- is simplified as b-, thus the word benefit can be simplified as bfit. The suffix -ing is simplified as -g, and the word living can be simplified as livg. The prefix com- is simplified as c-, and the suffix -ion is simplified as -n, thus the word computation can be simplified as cputatn, etc. All the prefix in English can be simply replaced by the first letter of the prefix, and all the suffix can be simply replaced by the consonant letter of the suffix. Because the simplified word does not accord with the English word-formation rule, it will neither coincide with the code of other word, nor with it increase repeated code.

The simplified English input method disclosed in the present invention may be used on the said simple keyboard, and may also be used on the present computer keyboard combining with the corresponding software.

| Simplified prefix | prefix which is replaced |
|---|---|
| a- | ab-, ac-, ad-, af-, after-, ag-, al-, all-, ambi-, amphi-, an-, ana-, ant-, ante-, anti-, ap-, apo-, ar-, arch-, as-, at-, audio-, auto-, . . . |
| b- | be-, bene-, bi-, bio-, bis-, by-, . . . |
| c- | cata-, cent-, circum-, co(l)-, com-, con-, contra-, cor-, counter-, . . . |
| d- | de-, di-, dia-, dis-, . . . |
| e- | em-, en-, equi-, eu-, ex-, exo-, extra-, . . . |
| f- | for-, fore-, . . . |
| h- | hemi-, homo-, hydro-, . . . |
| i- | ig-, il-, im-, in-, inter-, intra-, intro-, ir-, . . . |
| k- | kilo-, . . . |
| m | magni-, mal-, meta-, micro-, milli-, mis-, mono-, multi-, . . . |

-continued

| Simplified prefix | prefix which is replaced |
|---|---|
| n- | ne-, neg-, neo-, non-, . . . |
| o- | ob-, oc-, octa-, octo-, of-, omni-, on-, op-, out-, over-, . . . |
| p- | pan-, para-, per-, peri-, poly-, post-, pre-, pro-, pseudo-, . . . |
| q- | quadr-, quasi-, . . . |
| r- | re-, ri-, retro-, . . . |
| s- | se-, semi-, step-, sub-, super-, sur-, sym-, syn-, . . . |
| t- | tele-, trans-, tri-, twi-, . . . |
| u- | ultra-, un-, under-, uni-, up-, . . . |
| v- | vice-, . . . |
| w- | well-, with-, . . . |

116. The following table lists the simplified suffixes of the typical suffixes:

| Simplified suffix | suffix which is replaced | Simplified suffix | suffix which is replaced |
|---|---|---|---|
| -a | -ag, -archy, . . . | -lk | -like, . . . |
| -bl | -able, -ible, . . . | -ls | -less, . . . |
| -c | -ic, -ical, -ice, . . . | -m | -dom; -ism, -some, . . . |
| -cd | -cide, . . . | -mt | -ment, -most . . . |
| -cr | -craft, -cracy, . . . | -n | -an, -en, -ian, -ern, -ion, -man, ... |
| -d | -ed, . . . | -ns | -ance, -ence, -ness, . . . |
| -e | -ee, . . . | -r | -er, -eer, -or, -ure, . . . |
| -fl | -ful, -fold, . . . | -sp | -ship, . . . |
| -g | -ing, . . . | -t | -ant, -ate, -ent, -ette, -(l)et, -ist, -ite, . . . |
| -gr | -graph, . . . | -td | -tude, . . . |
| -h | -ish, -th, . . . | -v | -ive, . . . |
| -hd | -hood, . . . | -ws | -ward(s), -wise, |
| -l | -al, -ial, . . . | -y | -cy, -ery, -fy, -ity, -ly, -ry, -sy, -ty, . . . |
| -lg | -ling, -ology, . . . | -z | -ese, -ess, -ise, -ize, -ous, . . . |

The Symbols on the Simple Keyboard of the Present Invention and the Input Method of Other Languages:

On the simple keyboard according to the present invention, when it is switched to the symbol input state, the user can strike the symbol key and select the desired symbols, according to the symbol number in the symbol list on the screen, or the user can strike the up and down roll keys ⇧⇩ to select the desired symbols.

On the said simple keyboard, by supplying corresponding software on the harddisk or inter chips, text input of other languages, such as Chinese whole phonetic input, Chinese holographic code input Chinese five strokes input, Japanese letters phonetic input, etc, can be achieved. In which the Chinese whole phonetic input method is the same as the normal English word input method, and has very low code repeated rate. The Chinese phonetics, which have repeated code, can be selected by being displayed on different rows on the screen at the same time and by being paged together. Further, by using the Microsoft new whole phonetic input method of Chinese version of Windows 98 on the simple keyboard of the present invention, Chinese whole sentence input can be achieved.

According to the above most preferred English word encoding and the simplifying principle of the above simplified English input method, one can encode English words with the said keys and farther build a Database of standard English word codes, thus to achieve the simple keyboard of the present invention on the present telephone keyboard, the present computer keyboard or other specially arranged keyboards with the above most preferred keyboard arrangement for English letters.

Besides, one can develop the text processing software of English word encoding and the simple keyboard drive. The said text processing software of English word encoding may have the function of quick search, and can add the self-made word encoding Database, readjust the word frequency according to the user's requirement, and arrange the common words on the default positions of the word list. The said software can be installed on the harddisk of the computer, or the said software can be hardened into chip or hardcard being put into the telephone set, the telegraphic TV set or computer.

According to the above normal English input method or the simplified English input method, one can input English on such electronic products as computer, telephone, telegraphic TV, on which the said text processing software of English word is installed. According to the above symbols and text input method of other languages, one can input symbols and texts of other languages. According to the operation of the ordinary computer keyboard, one can use the control key and the function key.

The above embodiments of the simple keyboard and the input method for the said keyboard of the present invention are descriptive, not restrictive, the scope of the present invention is limited by the attached claims. The above software developing technique is well known by the skilled in the art, and one can develop corresponding software with various computer languages, according to the encoding of the present invention. Technicians in the art should understand that reasonable modifications and changes of the present may be made under the condition of not departing from the scope and the spirits of the present invention.

What is claimed is:

1. A device having a keyboard suitable for text entry in which 26 letters of the alphabet are distributed over 10 keys each corresponding to a plurality of letters, and wherein:

the letters "J", "O" and "T" are assigned to a first key;
the letters "P", "Q" and "R" are assigned to a second key;
the letters "B" and "N" are assigned to a third key;
the letters "S" and "W" are assigned to a fourth key;
the letters "E", "F" and "V" are assigned to a fifth key;
the letters "G", "H" and "I" are assigned to a sixth key;
the letters "A", "M" and "Z" are assigned to a seventh key;
the letters "L" and "X" are assigned to a eighth key;
the letters "D" and "U" are assigned to a ninth key; and
the letters "C", "K" and "Y" are assigned to a tenth key.

2. The device according to claim 1, wherein the first through tenth keys are arranged in an array of 3 columns of keys arranged in 4 rows, each row having a left key on a left side of the row, a middle key in a middle of the row and a right key on a right side of the row, and wherein:

the first key is the left key in the first row;
the second key is the middle key in the first row;
the third key is the right key in the first row;
the fourth key is the left key in the second row;
the fifth key is the middle key in the second row;
the sixth key is the right key in the second row;
the seventh key is the left key in the third row;
the eighth key is the middle key in the third row;
the ninth key is the right key in the third row; and
the tenth key is the middle key in the fourth row.

3. The device according to claim 1, wherein the first through tenth keys are also assigned digits "1", "2", "3", "4", "5", "6", "7", "8", "9" and "0", respectively.

4. The device according to claim 1, wherein the device is a hand-held computer.

5. The device according to claim 1, wherein the device is a mobile telephone.

6. The device according to claim 1, further configured to accept entry of a prefix by typing a first letter of said prefix, and accept entry of a suffix by entry of only consonants appearing in said suffix.

7. The device according to claim 1, further comprising a database of words and a display, and wherein at least one word from the database is displayed on the display based on a sequence of key strokes entered via the keyboard and a frequency of occurrence of said at least one word relative to other words in the database consistent with a same sequence of key strokes, when the device is in a letter input state.

8. The device according to claim 7, wherein all words in the database corresponding to the same sequence of key strokes are displayed, when the device is in the letter input state.

9. The device according to claim 1, wherein the device is configured to accept a key stroke without a separate designation of which of the plurality of letters corresponding to a key is intended, when the device is in a letter input state.

* * * * *